(12) United States Patent
Fliess et al.

(10) Patent No.: US 12,492,930 B2
(45) Date of Patent: Dec. 9, 2025

(54) METERING SYSTEM AND METHOD FOR CONTROLLING A METERING SYSTEM

(71) Applicant: VERMES MICRODISPENSING GMBH, Holzkirchen (DE)

(72) Inventors: Mario Fliess, Munich (DE); Andreas Steinhauser, Munich (DE); Tobias Tetzner, Munich (DE)

(73) Assignee: VERMES MICRODISPENSING GMBH, Holzkirchen (DE)

( * ) Notice: Subject to any disclaimer, the term of this patent is extended or adjusted under 35 U.S.C. 154(b) by 691 days.

(21) Appl. No.: 17/297,893

(22) PCT Filed: Nov. 29, 2019

(86) PCT No.: PCT/EP2019/083127
§ 371 (c)(1),
(2) Date: May 27, 2021

(87) PCT Pub. No.: WO2020/120176
PCT Pub. Date: Jun. 18, 2020

(65) Prior Publication Data
US 2022/0034698 A1    Feb. 3, 2022

(30) Foreign Application Priority Data
Dec. 10, 2018    (DE) .................... 10 2018 131 567.8

(51) Int. Cl.
*B05C 5/02*    (2006.01)
*B05B 1/24*    (2006.01)
(Continued)

(52) U.S. Cl.
CPC .............. *G01F 11/08* (2013.01); *B05B 1/24* (2013.01); *B05B 1/306* (2013.01); *B05C 5/0237* (2013.01); *B05C 11/1034* (2013.01)

(58) Field of Classification Search
CPC . B05C 5/0225; B05C 5/0237; B05C 11/1034; B05B 1/24; B05B 1/306;
(Continued)

(56) References Cited

U.S. PATENT DOCUMENTS 2,335,935 A * 12/1943 Hanley ................. B05B 7/1281
239/536
3,053,461 A *  9/1962 Inglis .................... B05B 7/1281
239/533.1
(Continued)

FOREIGN PATENT DOCUMENTS

CN    102822483 A    12/2012
CN    102950081 A     3/2013
(Continued)

OTHER PUBLICATIONS

Machine Translation of DE1255009B (Year: 1967).*
(Continued)

*Primary Examiner* — Charles P. Cheyney
(74) *Attorney, Agent, or Firm* — Studebaker Brackett PLLC

(57) ABSTRACT

The invention relates to a dosing system (1) for dosing a dosing material. The dosing system (1) has a housing (11), comprising a nozzle (70) and a supply channel (62) for dosing material, and a discharge element (80) movably mounted in the housing (11) and an actuator unit (10) coupled to the discharge element. The actuator unit (10) comprises an actuator (12) having a membrane (13) which can be pressurized by means of a pressure medium in order to move the discharge element (80) in a discharge direction (RA). The discharge element (80) is formed separately and, for coupling to the actuator unit (10), is pressed by means of a force acting on the discharge element (80) against a side surface (19) of the membrane (13) pointing in the direction (Continued)

Figure 1:
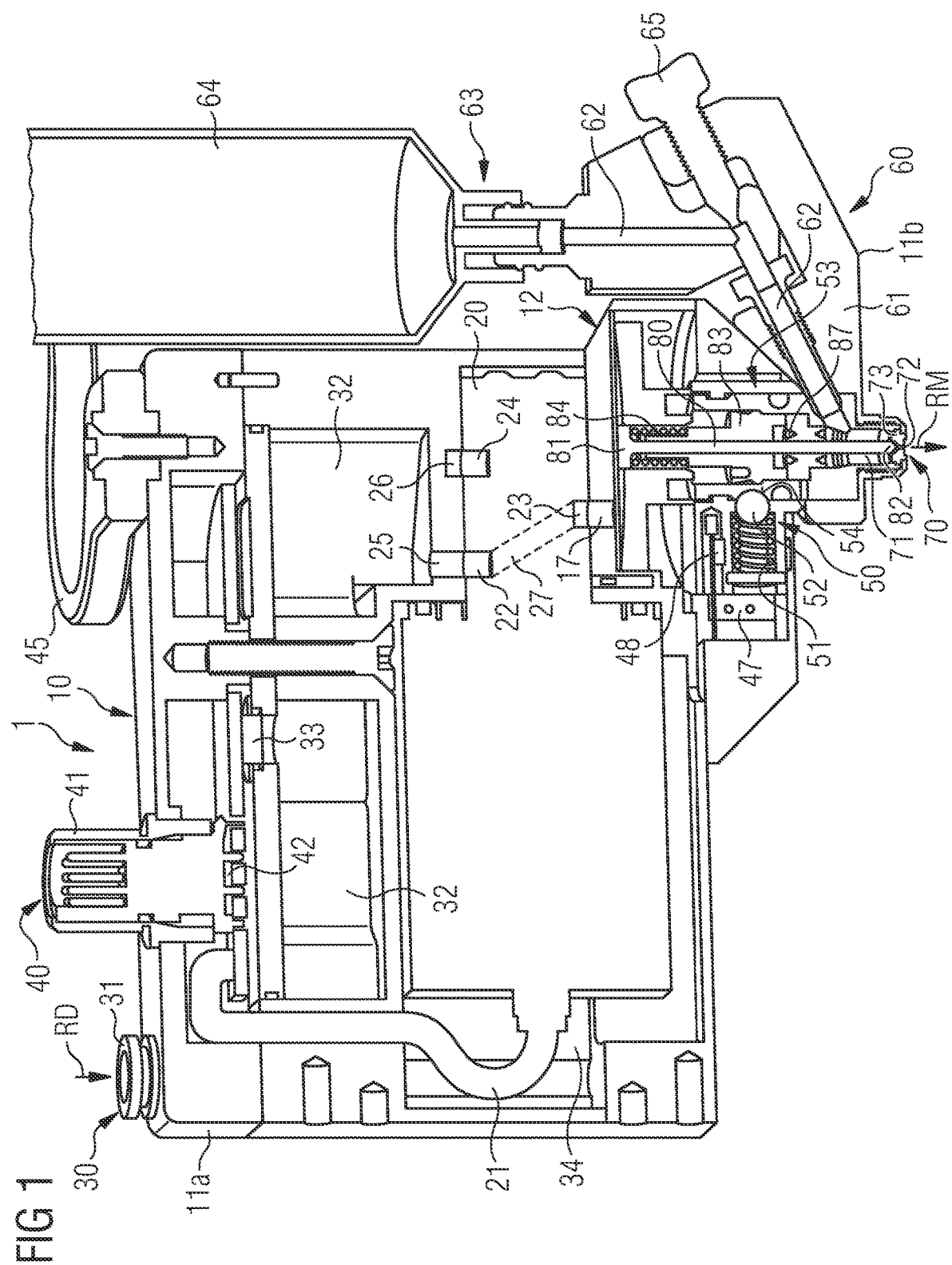

of the discharge element (80). Furthermore, the invention relates to a method for controlling a dosing system (1).

13 Claims, 8 Drawing Sheets

(51) Int. Cl.
| | | |
|---|---|---|
| *B05B 1/30* | (2006.01) | |
| *B05C 11/10* | (2006.01) | |
| *G01F 11/08* | (2006.01) | |

(58) Field of Classification Search
CPC ....... B05B 7/1272; B05B 7/066; G01F 11/08; F04B 13/00
USPC ............................ 222/504; 118/684; 239/412
See application file for complete search history.

(56) References Cited

U.S. PATENT DOCUMENTS

| | | | | |
|---|---|---|---|---|
| 3,463,363 | A * | 8/1969 | Zelna | B23K 3/0607 |
| | | | | 222/504 |
| 4,850,514 | A | 7/1989 | Scholl et al. | |
| 5,467,899 | A | 11/1995 | Miller | |
| 5,989,344 | A * | 11/1999 | Platsch | B05B 12/122 |
| | | | | 118/316 |
| 6,007,045 | A | 12/1999 | Heiniger et al. | |
| 6,685,444 | B2 * | 2/2004 | Ogawa | F04B 43/028 |
| | | | | 417/413.1 |
| 6,715,506 | B1 * | 4/2004 | Ikushima | B05C 11/1034 |
| | | | | 141/26 |
| 10,029,275 | B2 | 7/2018 | Pringle, IV et al. | |
| 10,090,453 | B2 * | 10/2018 | Conner | H10N 30/802 |
| 11,173,514 | B2 * | 11/2021 | Breault | F04B 15/00 |
| 11,389,821 | B2 * | 7/2022 | Fliess | B05C 5/0225 |
| 2005/0224513 | A1 * | 10/2005 | Strong | B05B 7/066 |
| | | | | 222/1 |
| 2006/0065868 | A1 * | 3/2006 | Strong | F16K 31/1221 |
| | | | | 251/63.5 |
| 2010/0230439 | A1 * | 9/2010 | Wootton | B29B 7/7668 |
| | | | | 222/145.5 |
| 2012/0168652 | A1 * | 7/2012 | Saine | B05C 5/0237 |
| | | | | 251/12 |
| 2013/0048751 | A1 | 2/2013 | Dian et al. | |
| 2013/0052359 | A1 | 2/2013 | Ahmadi et al. | |
| 2013/0068330 | A1 | 3/2013 | Ohmura et al. | |
| 2013/0105524 | A1 | 5/2013 | Saine | |
| 2016/0221022 | A1 | 8/2016 | Aguilar et al. | |
| 2020/0332916 | A1 * | 10/2020 | Herold | B05C 5/0237 |
| 2021/0018353 | A1 | 1/2021 | Fliess | |
| 2022/0048290 | A1 * | 2/2022 | Maeda | B05C 11/1013 |

FOREIGN PATENT DOCUMENTS

| | | | | |
|---|---|---|---|---|
| CN | 103062437 A | | 4/2013 | |
| CN | 103090086 A | | 5/2013 | |
| CN | 106914377 A | | 7/2017 | |
| DE | 1255009 B | * | 11/1967 | ........... B05B 7/1263 |
| DE | 39 25 080 A1 | | 2/1991 | |
| DE | 41 22 594 A1 | | 11/1992 | |
| DE | 10 2017 122 034 A1 | | 3/2019 | |
| DE | 10 2018 005 910 A1 | | 4/2019 | |
| DE | 10 2017 126 307 A1 | | 5/2019 | |
| EP | 0 111 850 A1 | | 6/1984 | |
| EP | 0 897 076 B1 | | 1/2002 | |
| EP | 2 586 535 A2 | | 5/2013 | |
| JP | 2013-044434 A | | 3/2013 | |
| WO | 2015/192896 A1 | | 12/2015 | |
| WO | 2019/091984 A1 | | 5/2019 | |

OTHER PUBLICATIONS

International Search Report issued in PCT/EP2019/083127; mailed Jun. 5, 2020.
An Office Action mailed by China National Intellectual Property Administration on Jul. 5, 2022, which corresponds to Chinese Patent Application No. 201980078383.5 and is related to U.S. Appl. No. 17/297,893 with English language translation.
An Office Action; mailed by the Japanese Patent Office on Jun. 17, 2025, which corresponds to Japanese Patent Application No. 2024-097471 and is related to U.S. Appl. No. 17/297,893; with English language translation.

* cited by examiner

METERING SYSTEM AND METHOD FOR CONTROLLING A METERING SYSTEM

The invention relates to a dosing system for dosing a liquid to viscous dosing material, preferably for applying the dosing material to a substrate, and a method for controlling such a dosing system.

Dosing systems of the type mentioned above are used in a variety of applications to dose a dosed medium in a targeted manner, typically a liquid to viscous dosing material. In the context of the so-called "microdosing technology", it is often necessary for very small amounts of the medium to be transported with high accuracy, that is, at the right time, in the right place and in a precisely dosed amount to a target surface.

The dosage is often contactless, that is, without a direct contact between the dosing system and the target surface. This can be done, for example, by a dropwise delivery of the dosing material via a nozzle of the dosing system. In this case, the medium comes into contact only with an interior space of the nozzle and, for the most part, region of a discharge element of the dosing system. The size of the droplets or the amount of the medium per droplet are predictable as accurately as possible by the structure and the control and by the thereby achieved targeted effect of the nozzle. Such a contactless method is often referred to as a "jet method". A typical example of this is the dosing of glue dots, solder pastes, etc., in the assembly of circuit boards or other electronic elements, or the application of converter materials for LEDs.

A movable discharge element can be arranged in the nozzle of the dosing system for the delivery of the medium from the dosing system. The discharge element can be pushed forward in the interior of the nozzle at a relatively high speed toward a nozzle opening or outlet opening, a drop of the media being discharged and then retracted again. This means that with the dosing systems mentioned above, and with the dosing system according to the invention, the dosing material is discharged from the nozzle by the discharge element itself. For discharge from the nozzle, the discharge element comes into contact with the dosing material to be discharged and "presses" or "pushes" the dosing material out of the nozzle of the dosing system due to a movement of the discharge element and/or the nozzle. The dosing material is thus discharged virtually "actively" from the nozzle by means of the movable discharge element. Dosing systems of this type, and the dosing system according to the invention, thus differ from other dispenser systems in which a movement of a closure element only leads to an opening of the nozzle, wherein the pressurized dosing material then emerges from the nozzle by itself. This is, for example, the case with injection valves of internal combustion engines.

Usually, the discharge element can also be brought into a closed position in which it is firmly connects in the nozzle to a sealing seat of the nozzle opening and remains there temporarily. With more viscous dosing materials, it can also be sufficient for the discharge element to remain simply in the retracted position, that is, away from the sealing seat, without a drop of the medium emerging.

The movement of the discharge element necessary for discharging the dosing material typically takes place with the aid of an actuator unit of the dosing system. Such an actuator unit can be realized in principle in various ways, for example, by means of a pneumatically or hydraulically operated actuator. Alternatively, piezoelectric and/or electromagnetically operated actuators are used. Compared to the aforementioned actuator principles, an actuator unit having a pneumatic or hydraulic actuator is characterized by a comparatively simple construction, which also reduces the overall complexity of the dosing system. Therefore, pneumatic or hydraulic actuators represent a cost-effective solution for the operation of dosing systems, in particular in the processing of easy-to-dose dosing materials.

Pneumatic or hydraulic actuators can be realized in various ways. For example, dosing systems are known in which the actuator is realized by means of a pneumatic or hydraulic cylinder. Since in such systems a comparatively high degree of wear occurs in the region of frictional seals of the cylinder, more and more pneumatic or hydraulic actuators are used which are realized by means of a bellows which can be pressurized by pressure medium.

A further preferred alternative is to form the pneumatic or hydraulic actuator by means of a membrane which can be pressurized by pressure medium. This variant has the advantage that, on the one hand, frictional seals, such as in a pneumatic or hydraulic cylinder, can be dispensed with. On the other hand, the design and manufacturing effort compared to "bellows-operated" actuators can be reduced. Further advantageous "membrane-operated" pneumatic or hydraulic actuators can be operated with a higher clock frequency than is usually the case with "bellows-operated" or "cylinder-operated" actuators. Therefore, "membrane-operated" pneumatic or hydraulic actuators are particularly suitable for extremely fine dosing requirements.

In order to transmit the force generated by a "membrane-operated" pneumatic or hydraulic actuator on the discharge element of the dosing system, a deflectable membrane of the actuator is firmly connected to the discharge element of the dosing system in known dosing systems. For example, the discharge element can be permanently welded, riveted, screwed, soldered or glued to the membrane. Likewise, it is possible for the discharge element to completely penetrate the membrane and to be screwed firmly to the membrane on at least one side surface of the membrane or to be firmly connected to the membrane by means of a securing ring or a pinning. A fixed coupling between the discharge element and the membrane can indeed be achieved with the aforementioned methods.

However, on the one hand, this construction also leads to a total mass of the membrane to be moved being increased due to a required connection mechanism. In order to still deflect or move the membrane in the desired manner, a diameter of the membrane can be increased in order to increase an acceleration force of the membrane. However, an increase in the membrane diameter also leads to a volume of an actuator chamber of the pneumatic or hydraulic actuator, which is filled to deflect the membrane by pressure medium, having to be increased. However, due to the design, this also leads to the filling or emptying process of the actuator chamber becoming more time-consuming, wherein the clock frequency of the dosing system is unnecessarily slowed down.

On the other hand, in a conventional pneumatic or hydraulic actuator, the membrane can be significantly weakened due to the fixed connection of the discharge element to the membrane. In particular, the connection point between the discharge element and the membrane can therefore form a weak point of the membrane in the manner of a predetermined breaking point, which can be problematic, in particular in continuous operation of the dosing system. As a result, a service life or useful life of the pneumatic actuator can be significantly shortened, which can cause a higher maintenance effort and thus higher operating costs of the dosing system.

It is therefore an object of the present invention to provide a dosing system having an actuator, with which the aforementioned disadvantages are reduced and preferably avoided. Furthermore, it is an object to provide a method for controlling such a dosing system.

This object is achieved by a dosing system according to patent claim 1 and by a method for controlling such a dosing system according to patent claim 13.

A dosing system according to the invention for dosing a liquid to viscous dosing material, in particular for preferably contactless application of a dosing material to a substrate, has an optionally multi-part housing, wherein the housing comprises at least one nozzle and a supply channel for dosing material. The dosing material to be dosed passes through the supply channel of the dosing system into a nozzle chamber of this nozzle.

The dosing system further has a discharge element, which is arranged movable in the housing, and an actuator unit coupled or interacting with the discharge element for dispensing the dosing material. As a result of the coupling, the actuator unit interacts with the discharge element in such a way that a dispensing of dosing material takes place from the nozzle of the dosing system by means of the discharge element. As explained above in the introductory part of the application, such a discharge element discharges the dosing material "actively". Preferably, the dosing system can be realized in the manner of a jet valve, wherein the dispensing of the dosing material can be done contactless as explained above.

According to the invention, the actuator unit comprises at least one actuator having a membrane which, as is explained later, is preferably formed disk-like, which can also be referred to as an "actuating membrane". The actuator particularly preferably comprises only a single membrane.

The actuator unit can further comprise further components required for movement of the discharge element in the dosing system, as is explained later. In contrast, preferably those components of the dosing system, which come into contact with the dosing material, for example, the discharge element, are consolidated into a fluidic unit of the dosing system, as will also be explained later.

The membrane of the actuator, in particular a side surface of the membrane facing away from the discharge element, can be pressurized by means of at least one pressure medium so that the discharge element is moved or deflected out of the nozzle in a discharge direction of the discharge element for discharging the dosing material. When the membrane is pressurized, the pressure medium, which is in particular moving, hits or strikes, as the name "pressurize" says, directly on the side surface (upper side) of the membrane facing away from the discharge element. This means that the membrane is deflected directly by the pressure medium itself in order to discharge dosing material from the nozzle. For this purpose, the discharge element is moved by means of the membrane in the direction of an outlet opening of the nozzle. The movement can be such that a tip of the discharge element directly abuts a sealing seat of the nozzle upon completion of the discharge movement. Alternatively, the discharge movement can also be previously stopped, so that a distance remains between the tip of the discharge element and the sealing seat of the nozzle.

According to the invention, the discharge element is formed separately with respect to the membrane, that is, it is a component separate from the membrane itself. The discharge element is particularly preferably formed in one piece. For coupling to the actuator unit, the discharge element is pressed during operation of the dosing system by means of a force acting directly on the discharge element by a contact pressure against a side surface of the membrane pointing in the direction of the discharge element into an operative position. The side surface of the membrane provided for coupling thus points away from the side surface of the membrane that can be pressurized with the pressure medium. The two side surfaces of the membrane correspond in terms of their design to a base surface of the membrane, as is explained later.

The side surface pointing in the direction of the discharge element or the nozzle is usually directed "downwards" when the dosing system is used as intended (namely since the dosing system in use is usually arranged so that the dosing agent is discharged downwards from the nozzle), and is therefore referred to in the following, without limitation thereto, as the "underside" of the membrane. The underside of the opposite side surface of the membrane, which can be pressurized by pressure medium, is accordingly referred to as "upper side" of the membrane.

For coupling between the discharge element, for example, a plunger, and the actuator unit, the force is exerted only on the discharge element itself, thus not on the membrane directly but only indirectly via the discharge element, that is, at least a part of the force due to the coupling can be transmitted from the discharge element to the membrane.

According to the invention, as mentioned, the discharge element is formed separately, that is, the discharge element is not fixedly or permanently connected to the membrane. In particular, no positive connection and no material connection between the respective components is necessary for coupling the discharge element to the actuator unit or the membrane of the actuator. Rather, the coupling takes place on the principle of adhesion. By means of the force acting on the discharge element, the discharge element can be kept continuously in operative contact with the side surface of the membrane pointing in the direction of the discharge element during operation of the dosing system. The discharge element and the membrane again form two uncoupled independent components only when the force acting on the discharge element for the coupling is missing or falls below a certain value.

The holding of the discharge element on the membrane thus takes place in particular "penetration-free" and "damage-free". This means that the discharge element, for example, is not screwed, welded, glued etc. to the membrane. In particular, there is substantially no change in the surface condition of an underside and/or upper side of the membrane for coupling.

Since the discharge element and the membrane are formed as independent, unconnected components, which are combined only by means of the force acting on the discharge element to a functional unit (the dosing system), it can advantageously be achieved by means of the dosing system according to the invention that only very small masses are to be moved by the actuator of the actuator unit during operation of the dosing system. Thus, on the one hand, a total weight of the actuating membrane can be kept as low as possible, wherein a volume of the actuator chamber for actuating the membrane can be kept small. This design can accelerate a filling and emptying process of the actuator chamber so that the actuator achieves very high dynamic values. Advantageously, the dosing system is therefore suitable for dosing high-viscosity dosing materials despite a comparatively simple design.

Further advantageously, in the dosing system according to the invention, a design-related material weakening of the membrane, as is often the case with conventional dosing systems in the region of the fixed connection between the membrane and the discharge element, can be almost completely avoided. Furthermore, frictional seals can be dispensed with in the actuator, such as those, for example, required in pneumatic or hydraulic cylinders. Advantageously, therefore, by means of the dosing system according to the invention, an uninterrupted service life of the actuator and thus also of the entire dosing system can be extended, wherein at the same time, very high clock frequencies are possible when dispensing the dosing material.

In a method according to the invention for controlling a dosing system for dosing a liquid to viscous dosing material, in particular for preferably contactless application of the dosing material to a substrate, the dosing system has an optionally multi-part housing, wherein the housing comprises at least one nozzle and a supply channel for dosing material. As mentioned above, the housing has a discharge element which is movably arranged in the housing, and an actuator unit which is coupled to or interacts with the discharge element for dispensing dosing material.

According to the invention, a (actuating) membrane of an actuator of the actuator unit is pressurized by a pressure medium in order to move or deflect the discharge element in a discharge direction of the discharge element for discharging the dosing material from the nozzle. Preferably, a side surface pointing away from the discharge element (also called "upper side") of the membrane is pressurized by the pressure medium in order to move the discharge element in the direction of a nozzle. A force is exerted on the discharge element itself for coupling to the actuator unit. By means of the force acting on the discharge element, the discharge element is pressed or pressured by a contact pressure against a side surface pointing in the direction of the discharge element (also called "underside") of the membrane. The force can be exerted on the discharge element so that the discharge element is continuously held in operative contact with the membrane during operation of the dosing system, in particular with the side surface of the membrane pointing in the direction of the discharge element.

Further, particularly advantageous embodiments and modifications of the invention are apparent from the dependent claims and the following description, wherein the independent claims of a claim category can also be further developed analogously to the dependent claims and embodiments of another claim category and in particular also individual features of different embodiments or variants can be combined to new embodiments or variants.

Preferably, the dosing system is formed so that the force of a discharge direction acting on the discharge element for coupling, for example, a plunger, that is, a direction of a discharge movement, is directed opposite of the discharge element. The discharge direction corresponds to the (linear) movement of the discharge element for dispensing the dosing material from the nozzle. The discharge direction is thus directed starting from the coupling point (between the discharge element and the membrane) to the nozzle of the dosing system. Preferably, therefore, a force can be exerted on the discharge element for coupling in such a way that a (operative) direction of the force points away from the nozzle and is aligned substantially at right angles to a base surface of the membrane of the actuator.

An opposite movement of the discharge element, which is synonymously also referred to as a "plunger", that is, a movement away from the nozzle, is referred to as a retraction movement. Accordingly, the retraction movement is in a retraction direction of the discharge element, as is explained in the following.

Particularly preferably, the dosing system can be formed so that the discharge element for coupling to the actuator unit by means of a force which is applied by at least one spring and/or pressure arrangement, is permanently pressed during operation to the discharge element pointing to the underside of the membrane. In particular, the force exerted by the spring and/or pressure arrangement is large enough to hold the discharge element in direct contact continuously to the underside of the membrane even during a retraction movement of the discharge element, that is, when the discharge element is moved away from the nozzle again in the direction of the actuator unit after dosing material has been discharged.

The spring and/or pressure arrangement can simply consist, as a spring arrangement, of a plurality of springs or other spring-loaded components. In the simplest and therefore often preferred case, it can consist of a single spring-loaded component, for example, a single spring, in particular coil spring. In the following, the spring arrangement (without limitation of generality) is also referred to as a spring or "return spring" for the sake of simplicity. Alternatively or additionally, the spring and/or pressure arrangement can also have press-on elements in another form, such as pneumatic pressure cylinders, another membrane device or the like.

Preferably, the return spring can be formed to move the discharge element within a certain time interval into a rest position in particular as soon as the membrane is no longer pressurized by pressure medium. The rest position of the discharge element is characterized in that a (during operation) greatest possible distance between a tip of the discharge element and the nozzle is reached, that is, the discharge element is pushed by the spring as far as possible upwards in the direction of the actuator unit. Preferably, the discharge element also directly abuts the underside of the membrane in a rest position.

In addition, the return spring can preferably also exert a "reset effect" on the membrane. The membrane can indeed preferably be formed so that it automatically returns within a certain time interval into a rest position as soon as the membrane is no longer pressurized by pressure medium, that is, the membrane can be formed elastic. However, the forces exerted by the return spring can at least support the elastic properties of the membrane, that is, the spring can facilitate a return of the membrane into the rest position.

Preferably, the return spring can therefore be formed to transmit a force to the membrane (indirectly by means of the discharge element), wherein the force preferably acts away from the nozzle in the direction of the actuator unit and is preferably determinable so that the return spring pushes the membrane (indirectly) upwards by a certain amount and/or even brings it into a rest position of the membrane. The rest position of the membrane is present when the membrane is currently not pressurized by pressure medium and/or is not deflected in the direction of the nozzle. In the rest position, the membrane or membrane wall can preferably extend substantially in one plane, that is, it has a profile that is substantially straight or linear in cross-section. But it is also possible that the membrane is curved in the rest position, at least in sections, "upward", that is, in the direction of the actuator unit, for example, in which the membrane is pushed by the discharge element up.

Preferably, the force can act on the discharge element for coupling as mentioned so that the discharge element, also in the rest position, indeed directly abuts the underside of the membrane, wherein, however, a previously mentioned linear profile of the membrane is maintained substantially in cross-section. Alternatively, however, the spring can also be dimensioned and/or designed so that the discharge element (in a rest position) pushes or deflects the membrane (in a rest position) upwards by a certain amount in the direction of the actuator unit. Preferably, in a rest position, the membrane can at least in regions directly abut a base body of the actuator.

The membrane of the actuator can preferably be formed like a disk. In this case, a disk is generally understood to mean a geometric body or a structure whose base surface is many times greater than its thickness. The base surface corresponds to an area of the membrane having the largest area measure. The base surface thus corresponds, on the one hand, to the side surface of the membrane pointing in the direction of the plunger and, on the other hand, to the (opposite) side surface of the membrane which can be pressurized by pressure medium.

A thickness of the membrane corresponds to an expansion of the membrane orthogonal to the base surface, wherein the thickness, for example, is taken from a section transverse the base surface (cross-section). Preferably, the membrane can have a constant uniform thickness throughout its entire extent. However, it is also possible for an edge region of the membrane (in cross-section) to be thinner than a middle region of the membrane. Thus, a stiffness of the membrane can be increased in the central region, for example, where the discharge element of the membrane abuts, wherein the membrane is deflected predominantly in the edge region when pressurized to pressure medium. An effective area of the membrane and thus the force generated by the membrane can be increased as a result. Alternatively or additionally, the membrane could have a bead in an edge region, as for example, is the case with speakers.

It is also conceivable that the membrane is corrugated in cross-section, for example, in the manner of a corrugated sheet, wherein a spring rate and thus a restoring force of the membrane is reduced compared to a "non-corrugated" or planar membrane. In the following, for the sake of simplicity, without limitation thereto, the starting point is a flat membrane having a uniform thickness, which in a rest position has a predominantly straight profile in cross-section.

Regardless of the specific configuration of the membrane, a thickness of the membrane can be at least 10 μm, preferably at least 50 μm, preferably at least 150 pm. A maximum thickness of the membrane can be at most 1000 μm, preferably at most 300 μm, preferably at most 200 μm.

Preferably, the base surface of the membrane can be formed substantially round or circular. However, in principle, it can also be elliptical, rectangular or formed any other way. It is preferred that the membrane is formed as a flat or thin, thus "plate-like" structure. Particularly preferably, the membrane is formed free of cavities, that is, no cavities such as liquid-filled and/or gas-filled chambers are located inside the membrane. A membrane thus differs significantly from a bellows, for example, a metal bellows. Unlike a membrane, a bellows comprises a more or less elastic hose which folds together "like an accordion" and an interior space sealed with respect to an environment, for example, a cavity filled with gas.

The membrane is preferably formed entirely of metal. Preferably, the membrane can comprise a mixture of different metals or an alloy. For example, the membrane can be formed from a stainless steel (spring steel). Alternatively, the membrane for example, can comprise a copper beryllium alloy. Furthermore, elastomers or plastics are conceivable as a material of the membrane. Depending on the requirements, it is also conceivable that a multilayer membrane is used, wherein the individual layers can be made of the same or different materials. For example, a membrane on the upper side and/or underside can have a special coating. Preferably, the membrane can be made so that it has a high vibration resistance and a certain elasticity, so that a desired deflection of the membrane is possible. Preferably, the membrane is made so that it represents an "active" expansion element with respect to a rigid base body of the actuator, as is explained in the following.

Preferably, the membrane, in particular an edge region of the membrane, is completely peripherally coupled to a rigid, possibly multi-part, base body of the actuator in a sealed manner. An actuator chamber of the actuator that can be pressurized by pressure medium is formed between the actuator base body and the membrane, in particular the upper side. The membrane, for example, can be welded or soldered to the body to configure the actuator chamber. Furthermore, the membrane can also be jammed with the actuator base body, for example, in which the membrane is clamped sealed between two housing parts of the actuator base body.

The actuator chamber is thus located within the actuator itself. Preferably, the actuator chamber can be formed gastight and/or liquid-tight with respect to an environment of the actuator. Preferably, the actuator base body comprises a breakthrough (in the following referred to as a "bore" without limitation of the generality) on an opposite side of the membrane, which breakthrough leads from the actuator chamber to the outside of the actuator chamber to enable actuation of the actuator. Preferably, a control valve of the actuator unit directly adjoins the bore to control a flow of the pressure medium through the bore, so as to "open" and "close" the actuator chamber, as is explained in the following.

Advantageously, the actuator is realized by means of only one membrane, so that only this sealed membrane needs to be coupled to the actuator base body. This enables a constructive simplification of the dosing system, in particular in comparison to "bellows-operated" systems. In the latter, the bellows or hose usually needs to be sealed at two opposite ends.

A pressure medium, for example, via the aforementioned bore, can be supplied to control the actuator, the actuator chamber. Preferably, an overpressure can be generated in the actuator chamber in order to deflect the membrane starting from a rest position "downwards", that is, in the direction of the nozzle of the dosing system. The amount of overpressure can be specified and, for example, act in accordance with the nature (for example, viscosity) of the dosing material. For example, the overpressure could be in the range of about 5 bar to 8 bar. However, significantly higher pressures are possible, as is explained later. The membrane can also be referred to as a pressure membrane, wherein the membrane is formed to transmit a force to the plunger and at the same time to seal the actuator chamber. Furthermore, the actuator chamber can also be emptied again by means of the same bore, that is, the overpressure in the actuator chamber is reduced, wherein the membrane, due to its elasticity and/or by means of the return spring, is brought back to a preferably vertical rest position.

The actuator chamber can in principle be filled with any flowing fluid, that is, (compressed) gaseous and/or liquid substances can be used as the pressure medium. Preferably, a compressed gaseous fluid can be used as the pressure medium, for example, a single gas or a gas mixture, for example, air. In the following, it is assumed that the actuator is operated using compressed room air, since this is already available in most systems having dosing systems. The actuator is therefore in the context of the application also synonymously referred to as a pneumatic actuator. However, the invention should not be so limited.

To control the actuator in an optimal way for the dispensing of dosing material, the above-mentioned bore of the actuator chamber, as directly mentioned preferably, adjoins the control valve of the actuator unit, in particular in a gas and/or liquid-tight manner. The control valve is preferably formed to control and/or regulate a supply of pressure medium into the actuator chamber and a discharge of pressure medium from the actuator chamber. For this purpose, the control valve is preferably coupled to a control and/or regulating unit of the dosing system. The control valve can, for example, be realized by means of a solenoid valve. Preferably, the control valve can be realized by means of a 3/2-way valve (for example, open rest position). Alternatively, the control valve for example, can comprise two 2/2-way valves. The control valve can also be referred to as a pneumatic valve.

Preferably, the control valve can be arranged in the actuator unit so that a first connection (working connection) of the control valve (gas-tight) interacts with the bore of the actuator chamber, wherein the actuator chamber can be filled by means of this connection by pressure medium and can also be emptied again. Preferably, a second connection (compressed air connection) of the control valve is functionally coupled to a compressed air supply of the dosing system. A third connection (vent connection) of the control valve can be coupled to a vent region of the actuator unit, as is explained later. Depending on the control of the control valve, the working connection can preferably interact either with the compressed air connection or the vent connection.

In order to supply the actuator chamber by means of the control valve with a sufficient amount of pressure medium during operation, the housing of the dosing system can comprise an internal pressure reservoir or a pressure tank for the pressurized pressure medium.

Preferably, this pressure tank can be formed bounded or isolated in the housing of the dosing system with respect to other housing regions. The pressure tank can comprise at least one supply opening for pressure medium into the pressure tank and a discharge opening for pressure medium out of the pressure tank, in particular for the supply line into the control valve. Preferably, the pressure tank can be dimensioned so that it can contain a sufficient amount of pressure medium for at least 250, preferably at least 2000, particularly preferably at least 10000 deflections of the membrane. Preferably, the pressure of the pressure medium in the pressure reservoir can be at least 2 bar, preferably at least 3 bar and particularly preferably at least 5 bar. Preferably, the pressure should be at most 1000 bar, more preferably at most 20 bar and most preferably at most 10 bar.

The pressure tank can be coupled to an external compressed air supply of the dosing system. For example, a compressed pressure medium can be supplied to the pressure reservoir by means of the supply opening, for example, in which an external pressure medium supply is connected to a corresponding coupling point of the housing of the dosing system. Preferably, a predeterminable pressure (target pressure) can be maintained substantially constant in the pressure tank, even during operation of the dosing system.

For the most efficient possible operation of the pneumatic actuator, the pressure reservoir can directly adjoin the control valve of the actuator unit in an interior of the housing. Preferably, the pressure reservoir is arranged in the housing of the dosing system so that the pressure medium can flow directly into the actuator chamber from the pressure tank in the shortest possible path. In other words, the pressure reservoir can be arranged as close as possible to the "demand point". Preferably, the discharge opening of the pressure tank is directly (gas-tight) coupled to the compressed air connection of the control valve.

Advantageously, the pressure reservoir thus represents a "pressure medium buffer" internal to the dosing system in order to dampen a pulsed consumption of pressure medium, especially at high dosing frequencies. Usually, dosing systems having pneumatic actuators have an external pressure tank for this purpose. However, there may be a drop in pressure in the pressure medium on the way from the external pressure tank to the actuator due to line losses, so that the actuator chamber is not filled with a desired, in particular constant, pressure. Furthermore, the pressure with which the actuator is filled, also referred to as filling pressure of the actuator, can have a significant influence on the dosing accuracy of the dosing system and possibly adversely affect it, as is explained later.

In contrast, in the described dosing system, the "pressure medium buffer" is arranged in the immediate vicinity of the actuator, so that no line is required between the pressure tank and the actuator chamber. This ensures that the actuator chamber is always filled with a pressure medium having a certain target pressure even at very high clock frequencies. On the one hand, this has said positive effect on the dosing accuracy.

On the other hand, significantly higher clock frequencies than with conventional dosing systems having pneumatic actuators can be achieved by means of this design, since even at very high clock frequencies, no line losses between pressure tank and pneumatic actuator occur. While dosing frequencies of up to about 330 Hz were possible up to now, the described structure enables dosing frequencies of 600 Hz and more. Basically, the internal "pressure medium buffer" also allows even higher clock frequencies (>700 Hz), wherein in this respect, the control valve represents the speed-limiting factor due to heat generation.

It should be noted that the configuration of a pressure reservoir internal to the housing in the immediate vicinity of the actuator is not limited to the above-mentioned dosing system according to the invention. Rather, this advantageous construction represents an independent partial aspect of the invention.

Advantageously, an internal pressure reservoir can therefore also be arranged in dosing systems having a pneumatic cylinder or in conventional "bellows-operated" or "membrane-operated" dosing systems, that is, also in such dosing systems in which, for example, a discharge element is fixedly connected to a membrane of the pneumatic actuator, that is, independent of the coupling according to the invention. Preferably, a dosing system can comprise a housing which comprises a nozzle and a supply channel for dosing material, and a discharge element movably mounted in the housing and an actuator unit coupled to the discharge element. The actuator unit can comprise an actuator having a membrane which can be pressurized by means of a pressure medium in order to move the discharge element in a discharge direction. Furthermore, the housing of the dosing system can comprise an internal pressure reservoir for the pressure medium. Particularly preferably, the reservoir can directly adjoin a control valve of the actuator unit for controlling the actuator.

Advantageously, it is thus possible (for the reasons explained above), even in conventional dosing systems, to increase the cycle frequency of the dispensing of dosing material and at the same time to achieve the highest possible dosing accuracy.

In order to further improve the beneficial effect of the internal "pressure medium buffer", the dosing system can preferably comprise, in addition to the internal pressure tank, a further, possibly larger, external pressure tank, for example, in the external pressure medium supply.

The concept of the internal pressure tank can profitably be supplemented by at least one pressure sensor being arranged in the pressure reservoir in such a way that a pressure of the pressure medium is measured in the pressure reservoir. For example, the pressure sensor could be realized in a wall of the pressure tank.

Preferably, the pressure sensor is arranged as close as possible to the pneumatic actuator. The pressure sensor can preferably be coupled to forward measured data to the control and/or regulating unit of the dosing system. On the one hand, the control and/or regulating unit can be formed as a direct component of a dosing system or, on the other hand, can be realized separately with respect to the dosing system. A third possibility is that the control and/or regulating unit is formed separately and is assigned to several dosing systems at the same time in order to control them separately from one another.

The term control is used in the following as a synonym for a control and/or regulation. That is, even when talking about a controller, the controller can include at least one regulation process. In a closed-loop control (regulation), a regulated variable (as an actual value) is generally recorded continuously and compared with a reference variable (as a target value). Usually, the regulation is carried out in such a manner that the regulation variable is adjusted to the reference variable. This means that the regulated variable (actual value) continuously influences itself in the path of action of the control loop.

In order to control the pressure in the pressure reservoir, the dosing system can comprise at least one controllable pressure regulator. Preferably, the pressure regulator is formed to control and/or regulate a pressure of the pressure medium in the pressure reservoir as a function of an input parameter, preferably by means of a control and/or regulation of a pressure of a pressure medium flowing into the housing of the dosing system or into the reservoir.

The pressure in the pressure reservoir, thus the pressure applied before the control valve, is also referred to as the supply pressure of the actuator. The supply pressure determines the maximum pressure with which the actuator chamber can be filled, that is, which pressure the pressure medium can at most have when it flows into the actuator chamber. In the simplest case, the supply pressure can also correspond to an actuator filling pressure. The actuator filling pressure corresponds to the pressure that the pressure medium in the (filled) actuator chamber actually has, for example, during a deflection of the membrane. Depending on the configuration of the dosing system, it is also possible for the actuator filling pressure to deviate from the supply pressure, as is explained later. Therefore, the pressure regulator can preferably also be formed to control and/or regulate a pressure with which the actuator is filled by pressure medium (actuator filling pressure) as a function of an input parameter.

The pressure regulator can, on the one hand, be mechanically or manually operated. Preferably, an input parameter can then be transmitted to an operator of the dosing system, wherein the operator then adjusts the pressure regulator so that a target pressure is reached in the pressure reservoir.

Preferably, an electronic pressure regulator can also be used. Particularly preferably, the pressure regulator can be controlled by means of the control and/or regulating unit of the dosing system, in particular taking into account input parameters. Regardless of the specific configuration (mechanical and/or electronic), the pressure regulator can preferably be arranged on the housing of the dosing system and/or in an external pressure medium supply line.

Preferably, the (mechanical or electronic) pressure regulator can be controlled or regulated as a function of an input parameter so that during operation of the dosing system, a certain, for example, a constant, speed of the discharge element (plunger speed) is achieved during the discharge movement.

An input parameter of the control or regulation can be, for example, a current pressure in the pressure reservoir. Preferably, the measurement data of the pressure sensor as input parameters (actual values) can be continuously compared with a predefinable target value by means of the control and/or regulating unit during operation. The control of the pressure regulator then preferably takes place so that, during operation, a target pressure is continuously present in the internal pressure tank or a constant plunger speed is achieved.

Advantageously, the dosing accuracy of the dosing system can be further improved by means of the pressure sensor and the internal pressure reservoir in interaction with the control and/or regulating unit. A decisive factor for an amount of dosing material discharged per plunger stroke is the plunger speed, in particular when impacting into the nozzle or in its sealing seat. Preferably, therefore, the plunger speed (during the discharge movement) can be adjusted during operation target value. The plunger speed depends largely on the actuator filling pressure.

In this regard, a higher actuator filling pressure causes a higher acceleration force of the membrane, resulting in a higher speed of the plunger. A low actuator filling pressure correspondingly results in a slower plunger speed during the discharge process. Pressure fluctuations during the filling process of the actuator chamber can therefore have a detrimental effect on the dosing accuracy. Advantageously, by means of a control and/or regulation of the pressure in the pressure tank and/or the actuator filling pressure, the plunger speed can be set to a predefinable value and, for example, be kept constant in order to increase the dosing accuracy even with very dynamic and/or high dosing requirements. For example, pressure fluctuations in the supply line could be compensated by means of this control or regulation.

In order to further improve the dosing accuracy, the dosing system can comprise at least one sensor for measuring a speed of movement of the discharge element. Preferably, a speed sensor can be arranged in a region of the rigid actuator base body. Preferably, the sensor can be arranged in a region of the actuator base body which is opposite the upper side of the membrane, that is, "above" the membrane. Preferably, the speed sensor and the discharge element, for example, a plunger head can be arranged on an imaginary (vertical) line. Preferably, the speed sensor is coupled to the control unit.

The speed sensor is preferably formed to detect a speed of the discharge element during the entire discharge movement and/or the total retraction movement of the discharge element. For example, the speed sensor can be realized by means of a position sensor (stroke sensor), which is formed to detect a plunger position as a function of time. Preferably, the speed sensor can be realized by means of a Hall sensor. Preferably, then a "head region" of the discharge element abutting the membrane can comprise a magnet.

Alternatively, the speed sensor could comprise a capacitive distance sensor. For example, the distance sensor and the membrane (as a movable mating surface) could form an electrical capacitor, for example, in which the membrane is formed in the manner of a capacitor plate.

Advantageously, the measured values of the speed sensor can be supplied to the control unit as a further input parameter. As an alternative or in addition to the measured values of the pressure sensor, the speed measured values can be used to control and/or regulate the supply pressure of the actuator and/or the actuator filling pressure in order to achieve, for example, a constant plunger speed, in particular when impacted in the sealing seat of the nozzle during operation. For example, fluctuations in the nature of the dosing material can be compensated for by means of this control or regulation.

A further alternative or additional possibility for setting the plunger speed is to control the filling process of the actuator by means of a throttle device. Preferably, the dosing system, for example, the control valve, comprises at least one controllable throttle device. The throttle device can be formed to control and/or regulate a pressure of the pressure medium in the actuator, in particular in the actuator chamber, as a function of an input parameter. Preferably, the throttle device can be formed to dynamically control and/or regulate a pressure in the actuator, in particular as a function of an input parameter. Preferably, the throttle device can be controlled so that a pressure in the actuator during a (first) discharge movement differs from the pressure in the actuator during a (second) subsequent discharge movement, that is, the pressure in the actuator can be changed "from pulse to pulse".

Preferably, the throttle device can comprise at least one controllable proportional valve and/or a controllable pressure regulator. The throttle device can be formed to control and/or regulate a volume flow or a flow rate of the pressure medium flowing into the actuator chamber. For example, the throttle can be arranged in the working connection of the control valve and/or in the bore of the actuator base body. Preferably, depending on the control of the flow cross-section, there can be a reduction or further increase, for example, corresponding to a maximum possible flow cross-section. Alternatively, in each case a controllable proportional valve could be arranged in the compressed air connection or in the vent connection of the control valve.

Furthermore, the throttle can alternatively or additionally be formed or be controlled so that the inflow of pressure medium into the actuator chamber is completely interrupted at a certain point in time. Preferably, the proportional valve in the working port could be closed (completely) as soon as a certain pressure is applied in the actuator chamber during the filling. Preferably, the throttle can be controlled so that a certain, for example, a maximum permissible pressure in the actuator chamber is not exceeded. Under certain circumstances, this can lead to the pressure of the filled actuator (for deflecting the membrane) being lower than the supply pressure. The dosing system can have a pressure sensor for measuring the pressure in the actuator chamber.

The throttle device can be realized by means of a mechanical or manual throttle. Preferably, at least one input parameter can be communicated to an operator of the dosing system, wherein the operator then adjusts the throttle (which could also be referred to an expansion valve) so that a certain (target) flow is achieved through the throttle and thus a desired plunger speed during the discharge movement of the plunger.

Preferably, the throttle device can be realized by means of an electronic throttle, for example, a proportional valve. Preferably, the throttle can be controlled by the control unit as a function of an input parameter, for example, an actual plunger speed, so that a certain flow volume or a desired pressure is achieved in the actuator chamber. Alternatively or additionally, the throttle device can be controlled so that a certain pressure in the actuator is not exceeded, in particular during the filling. Particularly preferably, the throttle device can be controlled depending on at least one input parameter so that a, for example, constant, specifiable plunger speed is achieved in the discharge movement and/or retraction movement.

Advantageously, the plunger speed can be set to a constant value during the discharge movement during operation by means of the controllable throttle device. The controllable throttle device thus represents a second alternative or additional variant in order to keep the plunger speed constant during operation and thus to further improve the dosing accuracy.

It should be pointed out that a previously described throttle device which is formed to control and/or regulate a pressure in the actuator as a function of an input parameter, preferably by means of a control and/or regulating unit of a dosing system, does not limit the aforementioned dosing system according to the invention, but represents an independent partial aspect of the invention. This means that even a dosing system of conventional design having a pneumatic actuator, for example, having a pneumatic cylinder or a fixed connection between the discharge element and membrane, can have such a throttle device.

In order to be able to further improve the dosing result, the dosing system can be formed to set a specific speed profile of the discharge element during a respective discharge movement and/or the retraction movement. The dynamic control of the speed of the discharge element is also referred to as flank control. Preferably, the dosing system, preferably the control valve, can comprise at least one throttle device, which is formed to control and/or regulate a pressure profile during a filling of the actuator by pressure medium and/or during an emptying or venting of the actuator. Preferably, the control and/or regulation can take place as a function of at least one input parameter.

For this purpose, the throttle device can be formed to adjust a flow rate of the fluid flowing through a local (variable) constriction of a flow cross-section in such a way that a filling process of the actuator chamber can be controlled in time. This means that, by means of the throttle, the pressure increase in the actuator chamber can be controlled in time (temporal control of the pressure profile). Preferably, the throttle can be formed to dynamically control or regulate the flow rate during a respective discharge movement and/or during a respective retracting movement of the discharge element.

Preferably, the throttle device can be controlled so that the pressure increase in the actuator chamber is dynamic or variable, that is, the pressure in the actuator chamber does not increase constantly or linearly. The pressure in the actuator, in particular in the actuator chamber as a function of time (during filling or venting), is referred to here as a pressure profile. Preferably, the throttle device can be controlled so that the speed of the plunger varies during the discharge movement, that is, that the plunger has two or more different speeds or is accelerated to two or more different speeds in a single discharge movement. Preferably, the speed of the plunger during the entire plunger movement can be controlled and/or regulated, that is, from the rest position to the impact in the nozzle.

The throttle device can be realized by means of a controllable proportional valve. Preferably at least one, for example, piezo-operated actuator having variable flow can be used for a highly resolved as possible control of a speed profile of the plunger during the discharge process. Preferably, the electronically controllable piezo-operated actuator is part of the throttle device and can be controlled by means of the control unit to control the volume flow (flow rate) of the pressure medium flowing into the actuator and/or the pressure medium flowing out of the actuator substantially without delay. For example, the control valve could be formed so that, by means of the actuator, a flow cross-section of the working connection of the control valve (for example, a 3/2-way valve or two 2/2-way valves) during the inflow and/or outflow of pressure medium in the actuator or from the actuator is substantially controllable (changeable) in real time.

Alternatively, it is also possible for the control valve to comprise two separately controllable proportional valves instead of a 3/2-way valve, whereby a throttle device is realized at the same time. Then a first proportional valve for the (controlled in time) filling of the actuator chamber and a second proportional valve for (controlled in time) venting of the actuator chamber could be used, wherein the two proportional valves can use the same or different bores of the actuator chamber. As a result, the pressure profile can be controlled or regulated separately during filling and venting.

An input parameter, on which the regulation depends, for example, can be a measurement signal of the speed sensor.

Preferably, a predeterminable speed profile of the plunger can also serve as an input parameter, which, for example, depending on the nature of the dosing material and/or the dosing requirement, is created and can be stored in the control unit. Preferably, the control unit can then control (adapt) the pressure during the filling of the actuator as a function of the actual speed of the plunger so that a desired speed profile is achieved in the discharge process. For example, the throttle device could be controlled so that the plunger is initially accelerated from its rest position by means of the membrane to a very high speed (strong inflow of pressure medium into the actuator, that is, rapid pressure increase in the actuator chamber) to achieve a shearing of the dosing material. In a second phase of the discharge movement, the plunger speed could then be reduced (reduced inflow of pressure medium into the actuator, that is, slower pressure rise in the actuator chamber) to achieve a clean discharge of the dosing material from the nozzle.

Advantageously, the dosing system, in particular by means of a throttle device designed in this way, can be controlled in such a way as to control the pressure profile and/or the time profile of the filling of the actuator. This can set a desired speed profile of the plunger movement during each phase of the discharge movement (also referred to as control of the flanks). Advantageously, the dosing accuracy can thus be further improved, in particular in which external influencing factors can be effectively compensated. For example, fluctuations in the dosing medium can be compensated, which can result from, for example, batch-dependency (viscosity), temperature-dependency or due to a material age (curing processes for adhesives). Furthermore, even small manufacturing tolerances or wear processes can be compensated by controlling the flanks.

As already mentioned, the throttle device can also be formed or controlled so as to effect a regulation of the pressure profile and/or the time profile of the emptying even when the actuator is being vented. This means that, even with the retraction movement, the plunger can have two or more different speeds or a defined speed profile. The regulation can preferably be carried out as a function of an input parameter, for example, measurement data of the speed sensor to achieve a predeterminable speed profile of the plunger. Advantageously, a retraction speed of the plunger can be determined so that during the retraction movement, no air is sucked through the nozzle opening of the nozzle, wherein the formation of air bubbles can be avoided in drops of the dosing material subsequently discharged from the nozzle.

In principle, a control and/or regulation of the pressure profile during the filling or emptying of the actuator chamber, preferably by means of the throttle device, so that a speed of the discharge element is varied during a discharge movement and/or during a retraction movement, is not limited to the aforementioned dosing system according to the invention but represents an independent partial aspect of the invention. This means that even a dosing system of conventional design having a pneumatic actuator, for example, having a pneumatic cylinder or a fixed connection between the discharge element and the membrane, can have a previously discussed throttle device, wherein such (known) dosing systems can be operated with a desired speed profile of the plunger movement.

Preferably, the dosing system can also be formed to increase an uninterrupted service life of the dosing system. For this purpose, the actuator unit can be formed to use the pressure medium flowing out of the actuator or out of the actuator chamber as the cooling medium for cooling the control valve. The venting or emptying of the actuator chamber is preferably carried out by means of the vent connection of the control valve, wherein the vent connection opens into a vent region of the actuator unit.

The control valve, for example, a solenoid valve, generates increasing heat during operation with increasing clock frequency, wherein an overheating can lead to a failure of the control valve. Preferably, the venting region is therefore formed as a cavity in the housing of the dosing system so that it encloses or surrounds the entire control valve from the outside. Preferably, the pressure medium can be guided past the control valve so that as much heat as possible is discharged from a surface of the control valve by means of the pressure medium. The pressure medium, for example, compressed air, is hardly heated due to the passage of the actuator and can therefore be used as a cooling medium. The venting region, which could also be referred to as a cooling region, thus forms a cooling device of the dosing system using the pressure medium. The housing can have a bore for discharging the pressure medium from the venting region.

For a particularly effective cooling of the control valve, the pressure medium could be actively cooled to a certain temperature before entering the housing, for example, by means of a refrigeration device. The control valve could thus be kept permanently below a critical operating temperature. Furthermore, a regulation of the active cooling would be conceivable, for example, in which the control valve comprises a temperature sensor and forwards corresponding measured values to the control unit. The control unit could then control the refrigeration device as a function of the measured values so that the refrigeration device provides a correspondingly highly cooled pressure medium in order to keep the temperature of the control valve below a critical value.

Advantageously, this cooling device can achieve the control valve being reliably maintained below a critical operating temperature during operation, wherein the reliability of the dosing system is improved. On the one hand, this makes it possible to operate the dosing system even at high outside temperatures. On the other hand, the clock frequencies of the dosing system can be increased with respect to conventional dosing systems, since even at very high clock frequencies, sufficient heat energy can be discharged from the control valve.

In order to further improve the reliability of the dosing system, it is possible to provide a pressure in the region between the actuator membrane and a plunger seal, which pressure substantially corresponds to a cartridge pressure (pressure of the dosing material in a dosing material cartridge). The plunger seal surrounds the plunger and is realized as part of the fluidic unit of the dosing system. Preferably, the plunger seal is located opposite an outlet opening of the nozzle, wherein the plunger seal delimits a nozzle chamber of the nozzle at the top. Due to the fact that the same pressure substantially prevails on both sides of the plunger seal, the tendency for dosing material to be pressed through the seal during operation is counteracted. Advantageously, the longevity of the seal can thus be increased.

Alternatively, a negative pressure, in particular a vacuum, can be provided between the actuator membrane, preferably the underside thereof, and the plunger seal. Advantageously, the performance of the actuator or of the dosing system can thus be increased, since the vacuum facilitates or supports the deflection of the membrane in the direction of the nozzle. This can be particularly advantageous for difficult-to-dose media, for example, with dosing materials having a high viscosity.

In order to be able to implement the previously explained advantageous embodiments of the dosing system during operation profitably, in a method for controlling the dosing system (control method), the pressure of the pressure medium flowing into the housing of the dosing system or in the internal pressure tank by means of the pressure regulator of the dosing system as a function of at least one input parameter is so controlled and/or regulated that the speed of the discharge element during a discharge movement, in particular when impacted in the nozzle, preferably corresponds to a target value. Preferably, the pressure regulator is controlled by means of the control unit of the dosing system.

The pressure of the pressure medium flowing into the actuator or actuator chamber and/or the pressure of the pressure medium flowing out of the actuator or actuator chamber is preferably controlled and/or regulated by means of the throttle device of the dosing system as a function of at least one input parameter so that the speed of the discharge element corresponds to a target value during a respective discharge movement and/or retraction movement. During operation, the control unit of the dosing system can preferably continuously receive measured values of at least one sensor, for example. from the speed sensor to perform a real-time comparison of the measured values (actual value) with a predefinable target value. Depending on this monitoring, the throttle device is then preferably controlled so that the pressure medium flows into the actuator with such a flow volume or flows out therefrom to achieve a desired plunger speed in the discharge movement and/or the retraction movement.

Furthermore, the control unit can control the throttle device so that a speed of the discharge element is varied during a single discharge movement and/or during a single retraction movement. Preferably, the discharge element can be accelerated to two or more different speeds for a single respective movement. Preferably, the control unit as a function of at least one input parameter, for example, speed measurement data, the flow rate of the pressure medium through the throttle device can control such that a certain speed profile of the plunger is achieved in the discharge and/or retraction movement. For example, the expansion valve can be controlled so that the actuator is first filled with a first pressure for a (single) discharge movement to reach a first discharge speed and then filled with a second differing pressure to reach a second discharge speed, which can differ from the first discharge speed.

As mentioned, the expansion valve or the throttle can also be used in a dosing system of conventional design. This can then be, as mentioned, for example, used to control and/or to regulate a pressure of the pressure medium so that a speed of the discharge element is varied during a discharge movement and/or during a retraction movement. That is, it is possible by means of the control method, to operate a dosing system regardless of the specific connection of the discharge element to the membrane so that a desired speed profile of the plunger movement is achieved.

Figure 2:
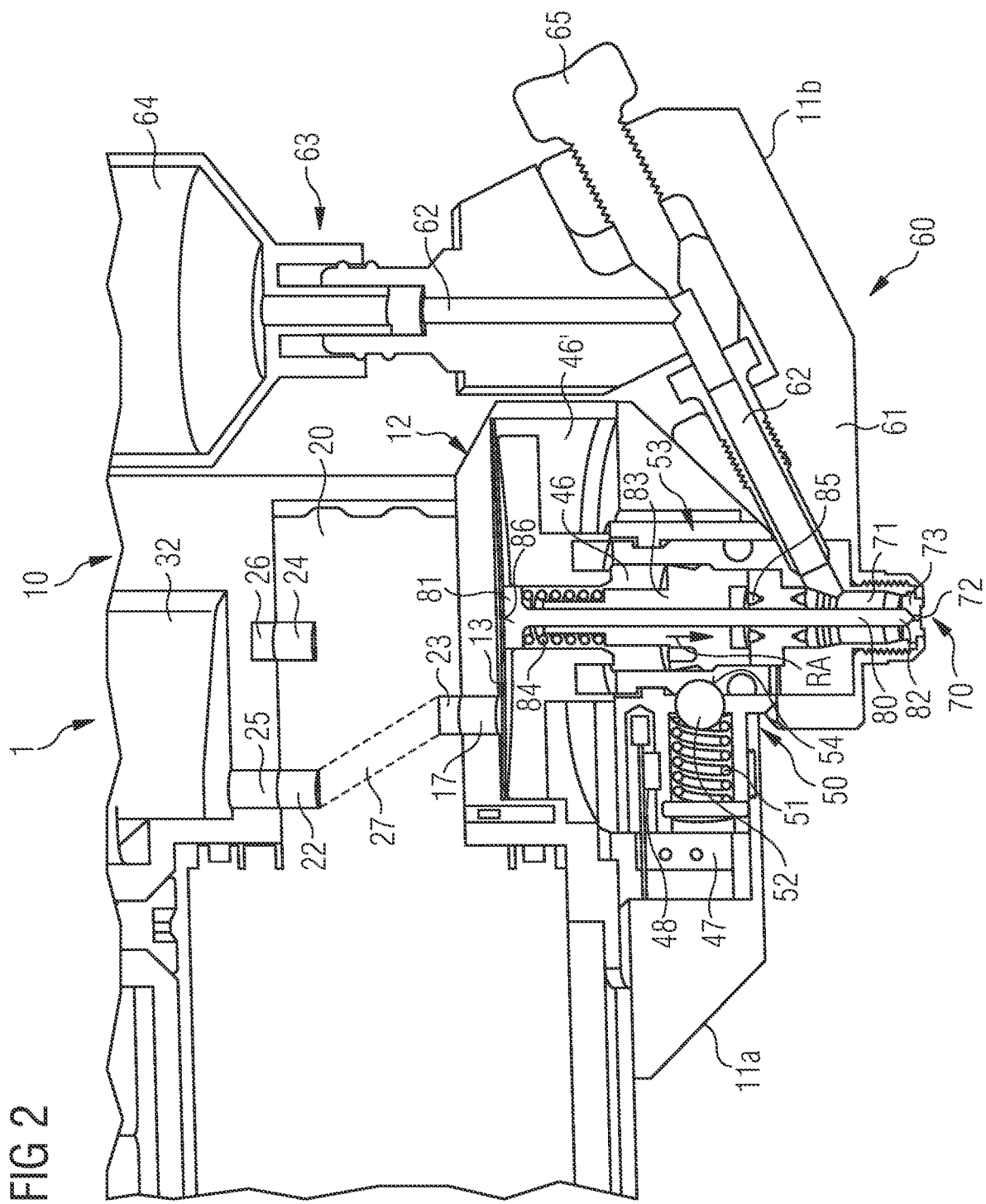
Figure 3:
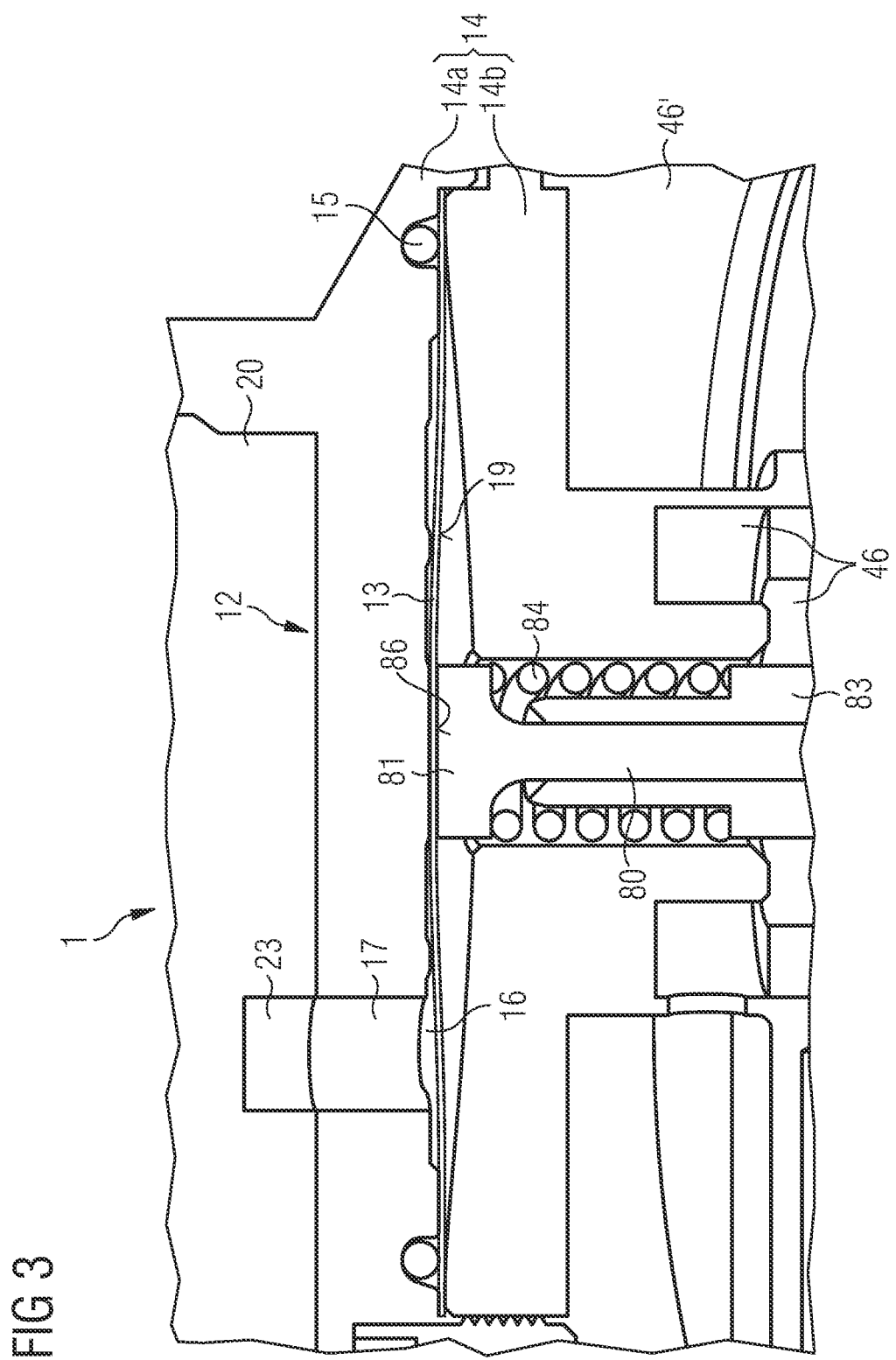
Figure 4:
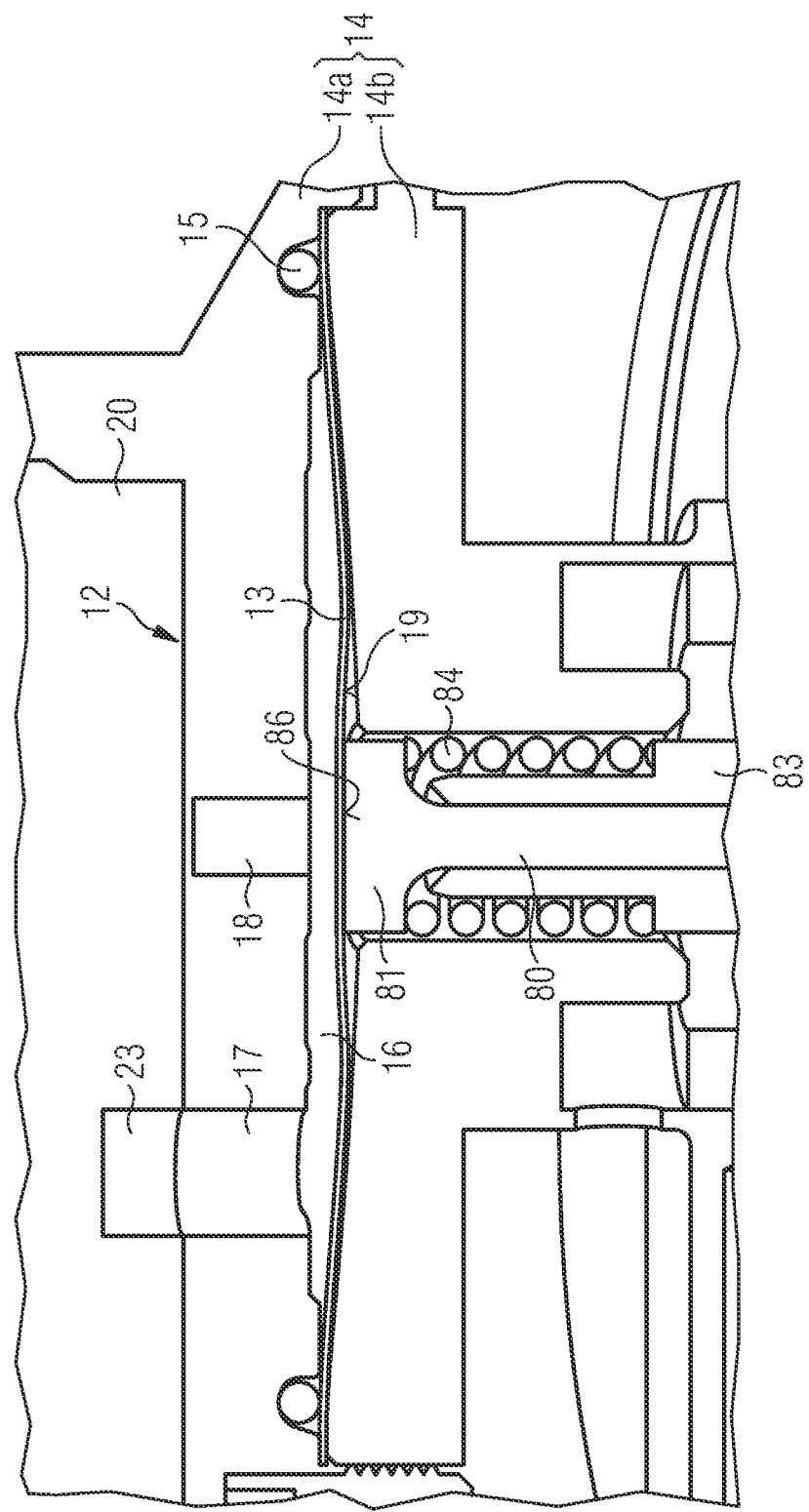
Figure 5:
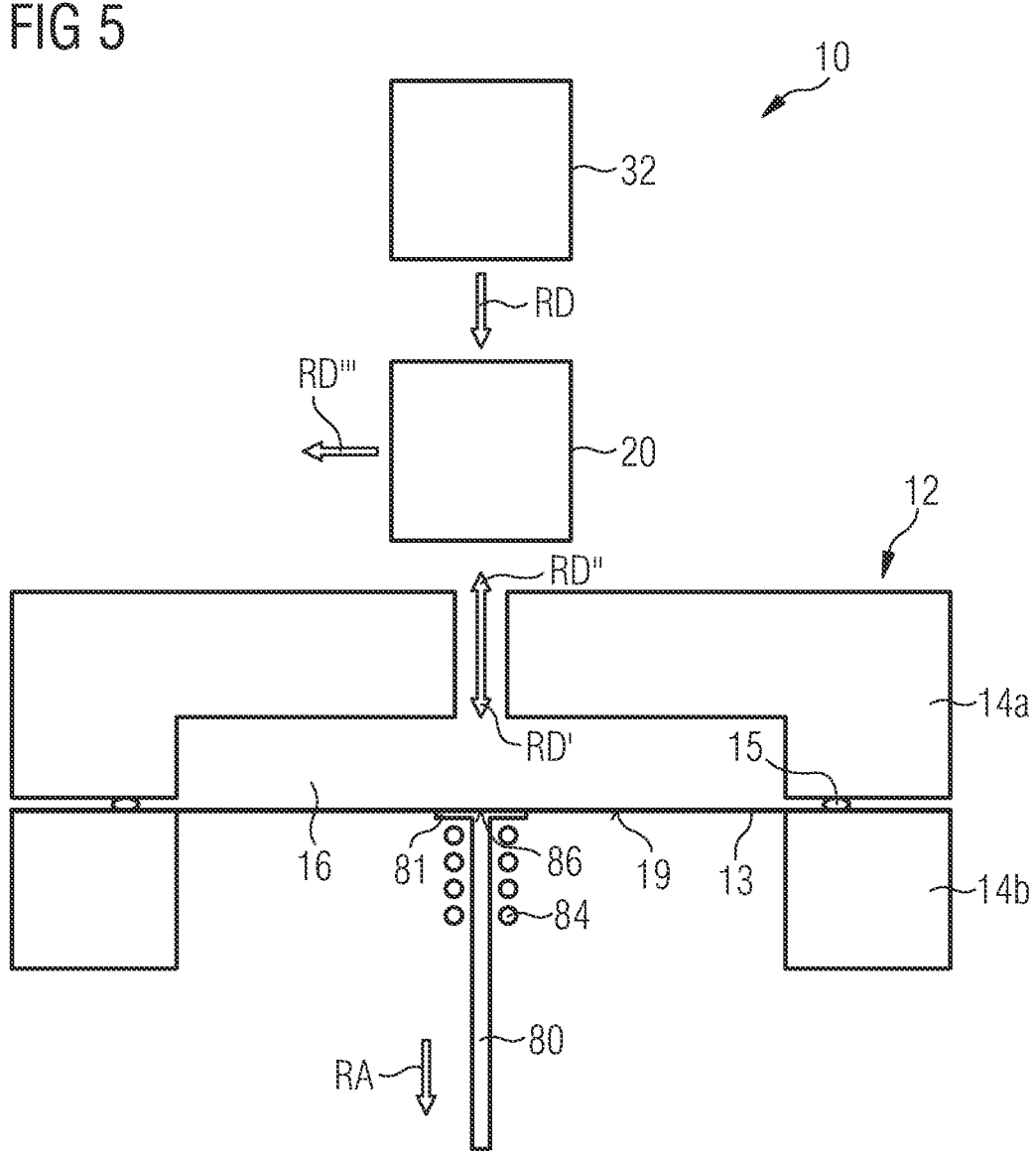
Figure 6:
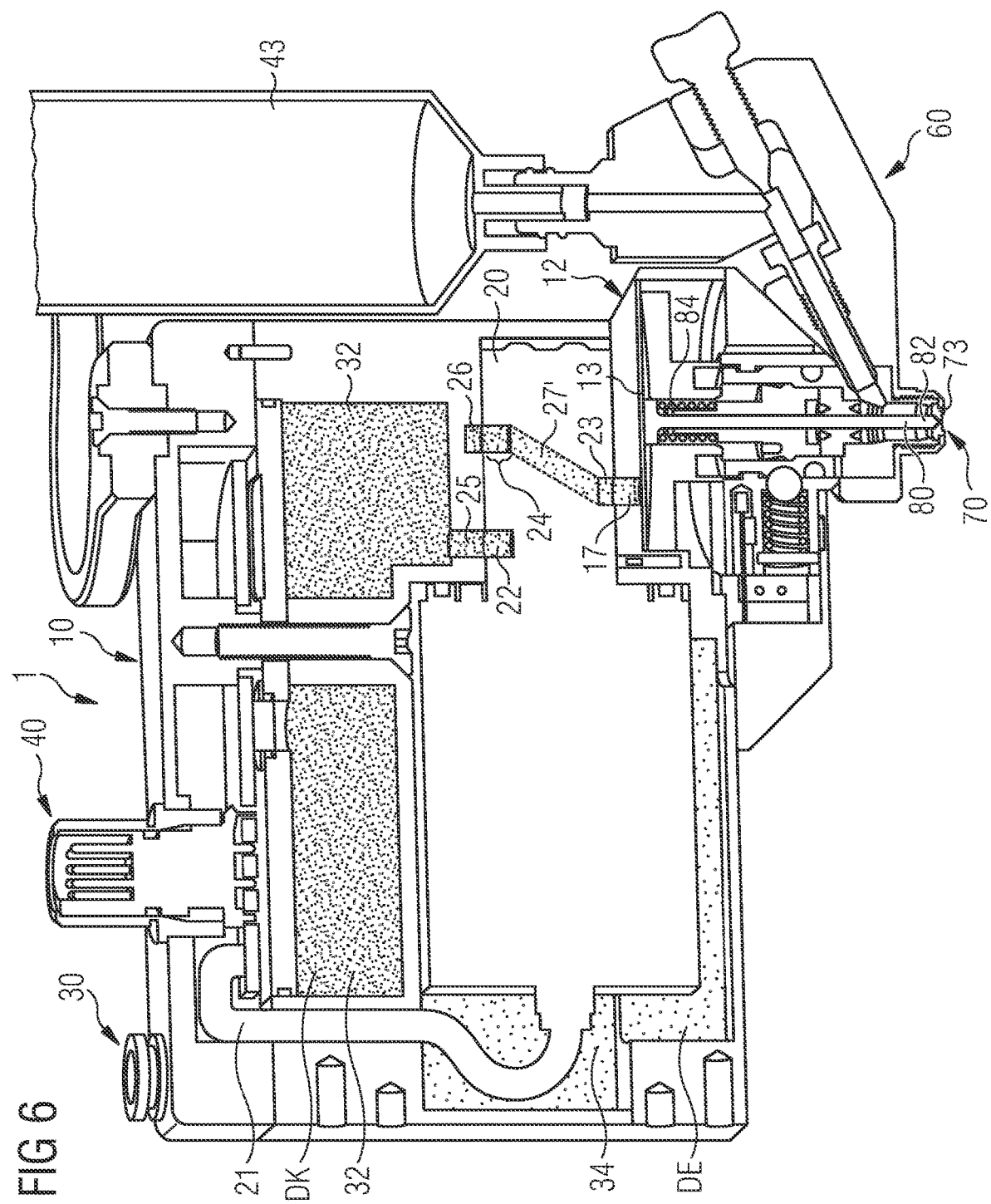
Figure 7:
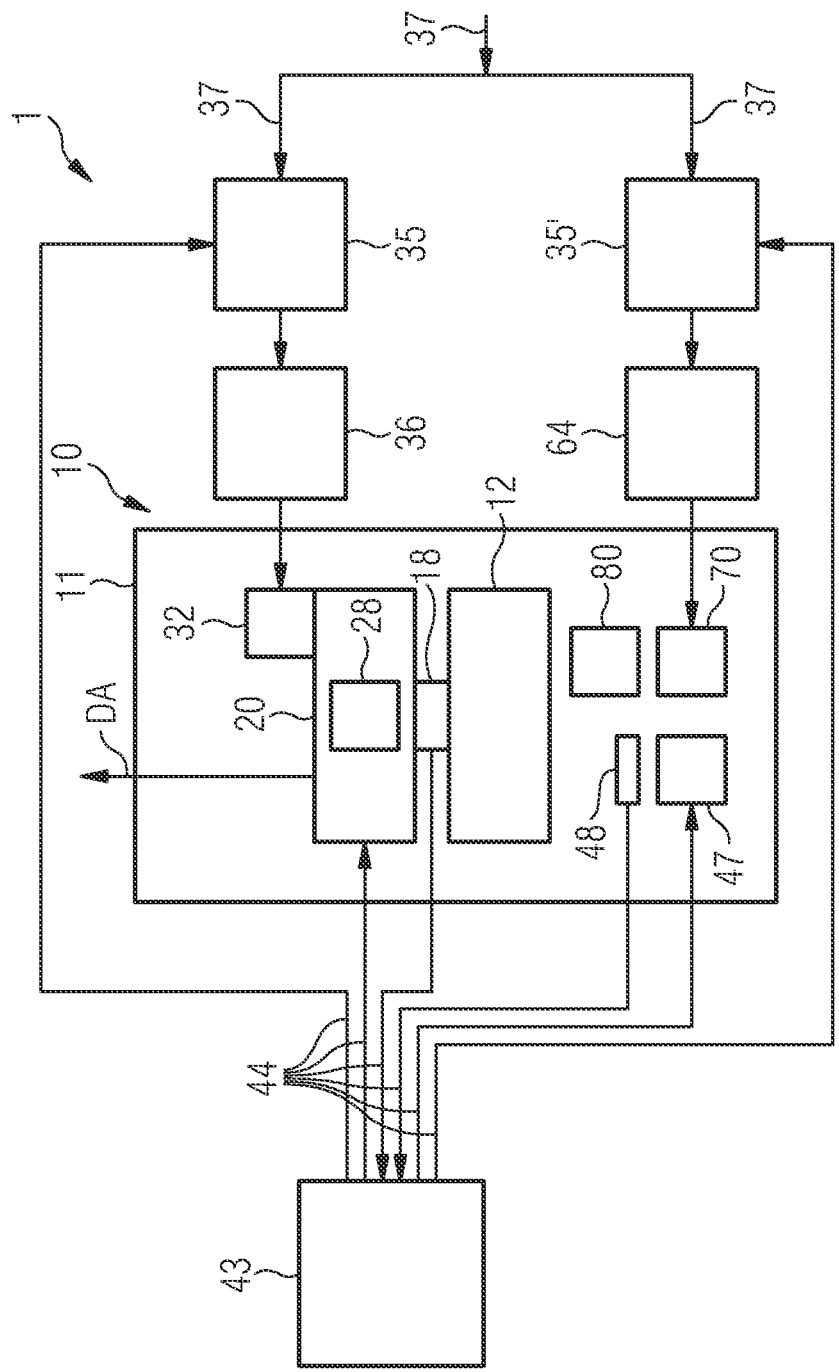
Figure 8:
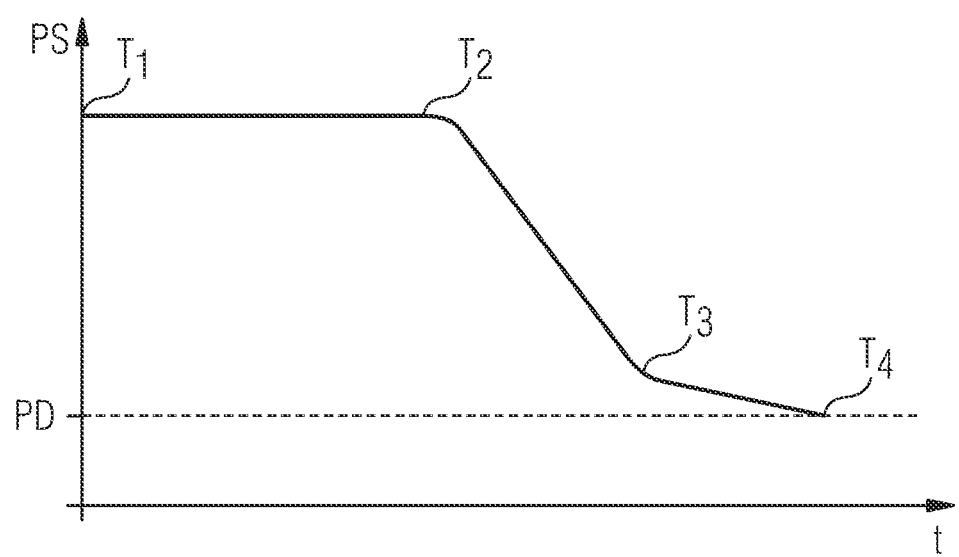

The invention is explained in more detail below with reference to the accompanying figures with reference to embodiments. In this case, the same components are provided with identical reference numerals in the various figures. The figures are usually not to scale. They show schematically:

FIG. 1 a sectional view of a dosing system according to an embodiment of the invention, FIG. 2 parts of the dosing system from FIG. 1 in an enlarged view, FIG. 3 parts of the dosing system from FIGS. 1 and 2 in a further enlarged view, FIG. 4 parts of a dosing system shown in section, similar to FIG. 3, according to a further embodiment of the invention, FIG. 5 a representation of an actuator unit of the dosing system according to an embodiment of the invention, FIG. 6 a representation of the dosing system from FIG. 1 in another functional position, FIG. 7 an illustration of a control method for a dosing system according to an embodiment of the invention, FIG. 8 a representation of a speed profile of a possible plunger movement according to an embodiment of the invention.

A specific embodiment of a dosing system 1 according to the invention is now described with reference to FIG. 1. The dosing system 1 is illustrated here in section in the usual position during intended operation of the dosing system 1. In this case, a nozzle 70 is located in the lower region of the dosing system 1, so that the drops of the medium are discharged downwards in a discharge direction RM through the nozzle 70. Insofar as the terms below and above are used in the following, these details therefore always refer to such a usual, customary position of the dosing system 1. However, this does not exclude that the dosing system 1 can also be used in special applications in a different position and the drops are discharged laterally, for example. Depending on the medium, pressure and precise construction and control of the entire discharge system, this is also basically possible.

The dosing system 1 comprises an actuator unit 10 and a fluidic unit 60 coupled thereto as essential components. The dosing system 1 shown here further comprises a dosing material cartridge 64, which is coupled to the fluidic unit 60.

In the embodiment of the dosing system 1 shown here, the actuator unit 10 and the fluidic unit 60 are realized in the manner of mutually couplable plug-in coupling parts for forming a quick coupling. Advantageously, the actuator unit 10 and the fluidic unit 60 can thus be coupled to each other without tools, so as to form the dosing system 1. The quick coupling comprises a coupling mechanism 50 having a coupling spring 51 which keeps a sphere 52 under constant tension. The coupling spring 51 and the sphere 52 are comprised here by a (first) actuator unit housing block 11 a and form a first plug-in coupling part. This is particularly clear in FIG. 2, which shows a detail of the dosing system of FIG. 1 in an enlarged view.

The coupling mechanism 50 has a number of spherical calottes 54 (only one shown in FIG. 2), in which the sphere 52 can engage for coupling. The spherical calottes 54 are arranged in a second plug-in coupling part 53 of the fluidic unit 60, wherein the fluidic unit 60 is comprised by a (second) fluidic unit housing block 11 b. For coupling, the first plug-in coupling part (the actuator unit 10) and the second plug-in coupling part (the fluidic unit 60) can be plugged into one another along a (virtual or imaginary) plug-in axis and thereby be coupled together. For example, the fluidic unit 60 can be plugged against the direction RM (see FIG. 1) into the actuator unit 10 and be coupled to the actuator unit 10 in a suitable rotational position.

The spherical calottes 54 are arranged in the second plug-in coupling part 53 of the fluidic unit 60 so that different latching positions are possible, that is, different rotational positions of the fluidic unit 60 about the plug-in axis are possible. The spring-biased sphere 52 of the plug-in coupling part 53 engages in one of the several possible latching positions, so as to form the dosing system 1.

The dosing system 1 thus comprises here a housing 11 having the two mentioned housing parts (housing blocks) 11a and 11b.

It should be noted, however, that the respective assemblies 10, 60 can also be firmly connected to each other, for example, by means of a fixing screw, so as to form the housing 11.

As can be seen in FIG. 1, the actuator unit 10 comprises substantially all components that provide for the drive or the movement of a discharge element 80, here a plunger 80, in the nozzle 70, that is, for example, a pneumatic actuator 12 in order to be able to actuate the discharge element 80 of the fluidic unit 60, a control valve 20, a control unit (not shown in FIGS. 1 and 2) to be able to control the pneumatic actuator 12 and similar components, as is explained in the following.

The fluidic unit 60 comprises, besides the nozzle 70 and a supply line 62 of the medium to the nozzle 70, all other parts which are in direct contact with the medium, and the elements which are required to assemble together the relevant parts in contact with the medium together or to hold in their position on the fluidic unit 60. Incidentally, the fluidic unit 60 also comprises means for bringing the discharge element 80 back into a rest position or starting position after dispensing of dosing material, as is explained in the following.

Since the basic structure of dosing systems is known, for the sake of greater clarity, components which at least indirectly affect the invention are predominantly shown here.

In the embodiment shown here (FIGS. 1 and 2) of the dosing system 1, the actuator unit 10, as mentioned, comprises a pneumatic actuator 12 which can be pressurized by pressure medium, in this case preferably compressed air. It should be noted that in FIGS. 1 and 2, the pneumatic actuator 12 and the coupling to the discharge element are shown only schematically. In particular, a membrane 13 of the actuator 12 is shown only schematically, that is, not in a real position or configuration that the membrane 13 actually has during operation during a deflection or a retraction. This is explained later with reference to FIGS. 3 and 4.

The pneumatic actuator 12 (FIG. 1) is coupled to the fluidic unit 60 in such a way that the plunger 80 is actuated by means of a control of the pneumatic actuator 12 in such a way that a medium to be dosed from the fluidic unit 60 is discharged in the desired amount at the desired time. In the case illustrated here, the plunger 80 currently closes a nozzle opening 72 and thus also serves as a closure element 80. However, since most of the medium is already discharged from the nozzle opening 72 when the plunger 80 is moved in an discharging direction RA (see FIG. 2), it is referred to herein as an discharge element 80. The coupling between pneumatic actuator 12 and plunger 80 is explained in detail later with reference to FIG. 3.

The pneumatic actuator 12 is arranged in the actuator unit 10 in the immediate vicinity of a control valve 20 for controlling the actuator 12. The control valve 20, for example, a pneumatic 3/2-way valve is formed to supply the actuator 12 a pressure medium, for example, compressed room air, and/or discharge a pressure medium from the actuator 12. For this purpose, the actuator 12 is arranged in the actuator unit 10 so that a bore 17 of the actuator 12 interacts with a working connection 23 of the control valve 20 and is spatially connected thereto. This becomes clear especially in FIG. 2.

The control valve 20 further comprises a compressed air connection 22 and a vent connection 24, wherein depending on the control or switching position of the control valve 20, either the compressed air connection 22 or the vent connection 24 interacts with or is connected to the working connection 23. The control valve 20 is coupled to a circuit board 42 of the dosing system by means of a connection cable 21 and can furthermore be controlled by a control unit of the dosing system 1 (for example, electrically) (see FIG. 1).

It can be seen in FIG. 2 that the control valve 20 is arranged in the actuator unit 10 so that the compressed air connection 22 interacts with or is connected to a bore 25 (here above left), wherein the bore 25 and the compressed air connection 22 substantially have the same diameter. The bore 25 here is realized as a discharge opening 25 of an internal pressure reservoir 32 (in the following also referred to as a pressure tank 32) of the dosing system 1. A pressure medium can be supplied through this bore 25 to the control valve 20 (via the compressed air connection 22) and thus subsequently also to the actuator 12 (via the working connection 23 and the bore 17).

The pressure tank 32 directly adjoins the control valve 20 here. Therefore, no connection lines are required between the pressure tank 32 and the control valve 20, apart from the bore 25, so that line losses can be largely prevented in the print medium. The pressure tank 32 extends into the housing block 11 a between the discharge opening 25 and a pressure medium supply device 30, which comprises a coupling point 31 for an external pressure medium supply (not shown) (see FIG. 1) and represents a cavity or a chamber in dosing system 1. A pressure medium having a certain pressure in a direction RD can be supplied to the pressure reservoir 32 by means of the pressure medium supply device 30. In addition to what is shown here, an external pressure medium supply line can additionally comprise a controllable pressure regulator, as is explained with reference to FIG. 7.

The pressure tank 32 is formed, in particular in cooperation with the pressure medium supply device 30 and the pressure regulator, to provide a pressure medium DK with a certain pressure during operation (see FIG. 6). The pressure of the pressure medium in the pressure tank 32 corresponds to the supply pressure of the actuator 12.

The pressure tank 32 here comprises a pressure sensor 33 in order to determine a pressure of the pressure medium in the pressure tank 32 (see FIG. 1). The pressure sensor 33 is arranged here on a circuit board 42 of the dosing system 1. The circuit board 42 can comprise or be coupled to various other electronic components, for example, a temperature sensor 48 or a heating device 47 or a heating element 47. The circuit board 42 is connected to a connection device 40, which comprises a coupling point 41 for a connection cable of the control unit (not shown). On the one hand, the measurement signals of the pressure sensor 33 or further sensors of the control unit of the dosing system 1 can be supplied by means of the coupling point 41, for example, a socket. On the other hand, the control unit can access the various electrical components of the dosing system 1 by means of the connection device 40, thus, for example, controlling the heating device 47. Furthermore, the control unit can also control the control valve 20 by means of the connection device 40, the circuit board 42 and the connection cable 21.

FIG. 1 furthermore shows that the control valve 20 comprises a vent connection 24 which interacts with or is connected to a bore 26 (here top right) of a venting region 34 of the dosing system 1, wherein the bore 26 and the vent connection 24 have substantially the same diameter. A pressure medium can be discharged from the actuator 12 by means of the vent connection 24 and the bore 26 and advantageously still be used for cooling the control valve 20. The venting region 34 is explained later with reference to FIG. 6.

The control valve 20 can be controlled by the control unit of the dosing system 1 in order to operate the pneumatic actuator 12 in the desired manner. The control valve shown in FIG. 1 (in the following also called "pneumatic valve") 20, for example, a pneumatic 3/2-way solenoid valve with a normal position, could be open (position "filling"). Accordingly, in a normal position of the pneumatic valve 20, the pressure medium is passed from the pressure reservoir 32 via the compressed air connection 22 and a flow channel 27 (illustrated here in broken lines) located in the pneumatic valve 20 to the working connection 23. The pressure medium flows in this first switching position of the control valve 20 with the pressure in an actuator chamber of the actuator 12 prevailing in the pressure reservoir 32 (supply pressure) to deflect a membrane of the actuator 12 and thus the plunger 80 downward in a discharge direction of the plunger 80, wherein a drop of the dosing material is discharged from the nozzle 70.

This means that in a normal position (first switching position) of the pneumatic valve 20, the actuator 12 is under a certain pressure, wherein a plunger tip 82 of the plunger 80 abuts a sealing seat 73 of the nozzle 70, that is, the nozzle 70 or the dosing system 1 is closed (see FIG. 2). It can, however, be different than shown here, in that the plunger tip 82 in the normal position of the solenoid valve 20, thus at a maximum deflection of the membrane, does not completely impact in the nozzle 70, wherein the discharge movement of the plunger 80 is stopped before, that is, spaced from the nozzle 70.

In the case shown in FIG. 2, the actuator 12 is filled with the pressure which is applied directly in front of the control valve 20, that is, the supply pressure of the actuator 12 also corresponds to the actuator filling pressure. But it is also possible in principle to fill the actuator 12 with a lower pressure than the supply pressure and/or to fill the actuator 12 with a dynamic pressure profile. For example, a certain speed profile in the discharge movement of the plunger 80 can thus be realized. To achieve this, the dosing system 1, for example, the solenoid valve 20 could be supplemented by one or more controllable actuators having variable throughput, for example, piezo-actuated actuators. Such an actuator could, for example, be arranged in the region of the working connection 23 (not shown).

In order to bring the actuator 12 back into a rest position after dispensing the dosing material, the pneumatic valve 20 can be switched by the control unit so that the working connection 23 is connected to the vent connection 24 by means of an internal flow channel 27' (see FIG. 6) of the solenoid valve 20 (second switch position). The pressure medium then flows into the venting region of the actuator unit 10. This is explained later with reference to FIG. 6.

The rest position of the actuator 12, as said before, is then present when both the mem-brane 13 and the discharge element 80 are in a rest position. The membrane 13 of the ac-tuator 12, which is currently not pressurized by pressure medium, returns back to its rest position due to its residual stress. In order to bring the plunger 80 back into a rest position, so that the nozzle opening 72 is released, a plunger head 81 of the plunger 80 is pressed by means of a return spring 84 upwards in the direction of the control valve 20. The exact operation of the actuator 12 is explained in detail later with reference to FIGS. 3 and 4.

It is particularly clear from FIG. 2 that the fluidic unit 60 of the dosing system 1 comprises a second housing part 11b and, as mentioned, is connected to the actuator unit 10 or its housing part 11a by means of a quick coupling to form the housing 11 here. The fluidic unit 60 comprises the plunger 80, which directly abuts against a contact surface 86 of the plunger head 81 of a side surface (underside) of the membrane 13 of the actuator 12 pointing in the direction of the plunger 80. The plunger 80 is here, as is also generally preferred with of the dosing system, in one piece, that is, formed from one piece. For coupling to the actuator unit 10 (only partially shown), the plunger 80, in particular the plunger head 81, is pressed by means of a spring 84 in the axial direction upwards against the membrane 13. The return spring 84 abuts a plunger bearing 83, which connects downward to a plunger seal 85. In the case shown here (FIG. 2), the membrane 13 (shown schematically) of the actuator 12 is pressurized by pressure medium (operating position of the actuator 12), so that the plunger tip 82 abuts the sealing seat 73 of the nozzle 70.

If the actuator 12, other than shown here, is located in a rest position, that is, the membrane 13 of the actuator 12 is not pressurized or not deflected, the plunger tip 82 is pushed away from the sealing seat 73 of the nozzle 70 by means of the return spring 84. The plunger tip 82 is then located at a distance from the sealing seat 73 of the nozzle 70, so that the nozzle opening 72 is free or unlocked.

The dosing material is supplied to the nozzle 70 via a nozzle chamber 71, to which a supply channel 62 leads (see FIG. 2). The supply channel 62 is embedded in a fluidic body 61 here. The supply channel 62 is, on the other hand, connected to a dosing material cartridge 64. The supply channel 62 is closed to the outside with a clamping screw 65. The dosing material cartridge 64 is reversibly fastened to the housing 11 in the region of a coupling point 63. Furthermore, the cartridge 64 is fastened here to the actuator unit 10 by means of a fixing element 45 (see FIG. 1).

In order to heat the dosing material in the region of the nozzle 70 to a specific processing temperature, the dosing system 1 comprises at least one heating device 47, for example, one or more heating plates 47 or heating foils 47. This becomes particularly clear in the enlarged view in FIG. 2. The heating device 47 can be controlled by means of the control unit. The heating device 47 is integrated here into the actuator unit 10 and first heats the coupling part of the actuator 10, thus, for example, the coupling mechanism 50. As soon as the plug-in coupling part 53 of the fluidic unit 60 is inserted into the coupling part of the actuator unit 10, the plug-in coupling part 53, in particular the dosing material in the nozzle 70, is heated to a certain temperature. The plug-in coupling part 53 is designed so that the best possible heat conduction is given in the direction of the nozzle 70. The fluidic unit 60 here does not comprise a separate heating device and can therefore be easily handled or disassembled even during operation.

In order to protect the pneumatic actuator 12 and in particular the control valve 20 against overheating, a substantial thermal decoupling of the heating device 47 is provided by the pneumatic actuator 12 in the dosing system 1. When the dosing system is assembled as intended, that is, when the fluidic unit 60 and the actuator unit 10 are coupled together as shown in FIG. 2, the dosing system 1 comprises a plurality of gas-filled cavities 46, 46'. The cavities 46, 46' are used for thermal decoupling of the pneumatic actuator 12 from the fluidic unit 60. A heat conduction from the heating device 47 in the direction of the actuator unit 10 and the control valve 20 can be effectively prevented by means of these cavities 46, 46'.

FIG. 3 shows a further enlarged part of the dosing system 1 according to FIGS. 1 and 2. However, the dosing system 1 is illustrated here in a different phase of the dosing process. As previously explained, FIGS. 1 and 2 show the dosing system 1 during a discharge process of dosing material from the nozzle. The nozzle 70 of the dosing system in this case is closed (FIGS. 1 and 2) by the plunger 80. In contrast, FIG. 3 shows a pneumatic actuator 12 in a rest position, that is, the membrane 13 of the actuator 12 is not deflected, wherein the discharge element 80 is located in a rest position. In the pneumatic actuator 12 according to FIG. 3, the nozzle 70 is therefore not closed by the discharge element 80.

The pneumatic actuator 12 of FIG. 3 is in direct operative contact with the working connection 23 of the pneumatic valve 20 by means of the bore 17. As mentioned, the actuator 12 comprises a rigid actuator base body 14, which is formed here by means of two components 14a, 14b. The two components 14a, 14b are arranged to each other, preferably stationary, so that they form a cavity in cross-section between them. By contrast, the two actuator base body parts 14a, 14b lie directly against one another in an outer region of the respective component 14a, 14b and are detachably pressed there against one another, so that the membrane 13 can be exchanged if necessary.

As mentioned, an (actuating) membrane 13 is arranged sealed between the two rigid basic body parts 14a, 14b to form an actuator chamber 16 of the actuator 12. It is clear here that the actuator 12 for moving the plunger 80 comprises only a single membrane 13. The membrane 13 is illustrated here in a rest position and is curved upward in a central region there where the discharge element 80 abuts the membrane 13. The spring 84 and the discharge element 80 press the membrane 13 here against the upper actuator base body 14a, to which the membrane 13 abuts at least in regions. The actuator base body 14a here thus limits the stroke or the deflection of the membrane 13 upwards. However, it is also conceivable that the actuator 12 is formed so that the membrane at least partially abuts the upper actuator base body 14a in a predominantly horizontal rest position, for example, in which the actuator base body 14a has an extension pointing in the direction of the membrane 13 or a bulge (not shown) in the region of the plunger head 81.

Although this does not appear from the sectional view according to FIG. 3, the membrane 13 preferably has a circular base surface and is coupled in a gas-tight manner with its edge region completely circumferentially to the two base body parts 14a, 14b of the rigid base body 14. For this purpose, the membrane 13 is pressed in the edge region from below by means of the lower base body component 14b against the upper base body component 14a. For sealing, a sealing ring 15 is arranged between the membrane 13 and the upper components 14a, for example, an O-ring 15.

As mentioned, the actuator chamber 16 of the actuator 12 is formed here between a side surface (upper side) of the membrane 13 pointing away from the discharge element 80 and to the here upper rigid actuator base body part 14a. The actuator chamber 16 can be filled by means of the bore 17 with a pressure medium to deflect the membrane 13 downward from the rest position shown here. This is shown schematically again later with reference to FIG. 4.

The plunger head 81 is pressed by means of a spring 84 against the underside 19 of the membrane 13 to couple the discharge element 80 to the actuator unit. The return spring 84 is formed so that it exerts such a (spring) force on the plunger 80 that it is held in direct operative contact with the underside 19 even in a rest position of the actuator 12. In the case shown here, the plunger 80 pushes the membrane 13 (at least a central region of the membrane 13) upwardly beyond a horizontal rest position, wherein the deflection is limited by the component 14a.

FIG. 4 shows a section of a dosing system illustrated in section according to a further embodiment. The difference from the dosing systems shown so far (FIGS. 1 to 3) is that the pneumatic actuator 12 here additionally comprises a sensor 18 for determining a speed of a movement of the discharge element 80.

The sensor 18 is here arranged in the upper actuator base body part 14a so that it is located on an imaginary vertical line (corresponding to a longitudinal extent of the plunger 80) with the plunger 80. The sensor 18 and the plunger head 81 lie directly opposite each other on respective different sides of the membrane 13. To determine the speed of the plunger 80 during each phase of the discharge movement and/or the retracting movement, the sensor 18 can include a position sensor 18 to detect a distance between the sensor 18 and the plunger head 81 as a function of time. For example, the sensor 18 can be a Hall sensor, wherein the plunger head 81 would comprise a magnet (not shown). The sensor 18 is coupled to the control unit of the dosing system 1 (not shown here) to forward the measured data.

It is further clear in the detailed view of FIG. 4 that the membrane 13 is deformed for dispensing dosing material. As in FIGS. 1 and 2, the actuator 12 is also shown here in an operating position. This means that the upper side of the membrane 13 is currently pressurized by pressure medium. As can be seen here, due to the pressurization, the membrane 13 is not deflected uniformly downwards in the direction of the plunger 80. Rather, there are regions of the membrane 13 which are moved down more and other regions that hardly undergo a change in position.

Due to the design, the edge regions of the membrane 13, where the membrane 13 is coupled to the actuator base body 14, are hardly deflected. In addition, the region of the membrane 13, which abuts the plunger head 81, is deflected comparatively little. This is because the plunger 80 is pressed against the underside 19 of the membrane 13 by means of the spring 84. The spring 84 thus sets the deflection of the membrane 13 against a certain force. However, the spring 84 is configured so that the membrane 13 overcomes a spring force of the spring 84 during the deflection and deflects the plunger 80 for dispensing dosing material by a desired amount in the direction of the nozzle.

In contrast, the central regions of the membrane 13, which lie in the illustrated cross-section between the plunger head 81 and the edge region of the membrane 13, experience a relatively strong deflection downward. The membrane 13 is thus deformed during the deflection as a virtual "waveform".

FIG. 5 again shows, roughly schematically, the structure and the control of the actuator unit according to an embodiment of the invention. The actuator unit 10 comprises an internal pressure reservoir 32, which holds pressure medium with a certain supply pressure. The pressure medium is supplied to a control valve 20 in a flow direction RD. The control valve 20 is controlled by means of a control unit (not shown) so that the pressure medium flows into an actuator chamber 16 of a pneumatic actuator 12 in a direction RD'. Depending on the configuration of the actuator unit 10, an optional throttle device (not shown) can be controlled so that the actuator chamber 16 is filled with a supply pressure or an actuator filling pressure by pressure medium deviating therefrom.

Due to the pressurization by pressure medium, the membrane 13 and thus also the discharge element 80 is deflected downwards in a direction RA for dispensing of dosing material.

In a next step, the control valve 20 is controlled by the control unit so that the actuator chamber 16 is vented immediately after the dispensing of dosing material. The pressure medium leaves the actuator chamber 16 in a flow direction RD" and flows into the control valve 20 before it leaves this in a direction RD"'. Due to the pressure reduction in the actuator chamber 16, the membrane 13 swings back into its rest position. The discharge element 80 follows the movement of the membrane 13 immediately or simultaneously, if necessary, the discharge element 80 even supports the movement of the membrane 13, and is moved back into a rest position by means of a spring 84. A cycle of dispensing of dosing material is thus passed through.

FIG. 6 shows the dosing system of FIGS. 1 to 3 during a venting of the pneumatic ac-tuator. The control valve 20 is here controlled by the control unit (not shown) so that the working connection 23 interacts with the vent connection 24. For this purpose, the control valve 20 is moved to a second switching position, so that in the interior of the control valve 20, a flow channel 27' (shown here in broken lines), connects the two connections 23, 24. The pressure medium flows out of the actuator 12 via the bore 17 and is conducted through the flow channel 27' to the vent connection 24 and finally into the venting region 34. The plunger 80 is pushed by means of the spring 84 away from the nozzle 70 upwards in the direction of the actuator unit 10, so that a small gap between the plunger tip 82 and the sealing seat 73 is formed (not shown). The membrane 13 is shown here in a horizontal "intermediate position", that is, the membrane returns currently back to a rest position due to the venting of the actuator chamber.

The venting region 34 represents a cavity or a chamber within the housing of the actuator unit 10. In this illustration, the chamber of the venting region 34 is covered by the inflowing pressure medium DE. The pressure medium has a low pressure in the vent region 34 as the actuator supply pressure and is therefore designated as an expanded pressure medium DE. On the one hand, the venting region 34 directly adjoins the control valve 20 by means of the bore 26 and, on the other hand, has a bore to the outside of the dosing system (not shown). As shown here, the vent region 34 encloses a substantial portion of the control valve 20 from the outside.

The venting region 34 is separated spatially and in terms of control technology in particular from the pressure tank 32 of the actuator unit 10. The pressure tank 32 is here filled with a compressed pressure medium DK, wherein a chamber forming the pressure tank 32 is covered by the pressure medium DK.

The pressure medium flowing into the vent region 34 can be guided past the control valve, for example, by means of flow-conducting elements in order to discharge as much heat as possible from a surface of the control valve 20. The pressure medium, for example, compressed air, is hardly heated due to the passage of the actuator 12 and can therefore be used as a cooling medium. Due to the comparatively large volume of the venting region 34, in particular with respect to the actuator chamber, the pressure of the pressure medium in the venting region 34 can be significantly lower than, for example, in the pressure reservoir 32 and/or in the actuator chamber.

FIG. 7 shows a schematic representation of a control method for a dosing system 1 according to an embodiment of the invention. The dosing system 1 here comprises a housing 11, in which the essential components of the actuator unit 10 and the fluidic unit are enclosed. The dosing system 1 further comprises a control unit 43 having a number of connection cables 44 in order to separately control the respective components of the dosing system 1.

The control unit 43 is, on the one hand, coupled to a pressure regulator 35 in order to control and/or regulate the pressure of the pressure medium flowing into the internal pressure tank 32. The pressure regulator 35 is coupled to a pressure medium supply 37 and is arranged here, for example, outside the housing 11 of the dosing system 1 as a component of the actuator 10. An external pressure reservoir 36 is optionally arranged here between the pressure regulator 35 and the internal pressure tank 32. The pressure regulator 35 can be controlled by the control unit 43, preferably as a function of input parameters, for example, a plunger speed, so that a certain pressure is present in the external pressure tank 36 or in the internal pressure tank 32 to achieve a constant plunger speed during the discharge process.

For controlling the actuator 12, the control unit 43, on the other hand, can control the control valve 20 to fill the actuator chamber of the actuator 12 (by means of the pressure medium from the internal pressure tank 32) or to vent (by means of a pressure medium outlet DA). The actuator 12 of the dosing system 1 is coupled to a sensor 18, for example, a position sensor 18, wherein the measurement data are transmitted as input parameters to the control unit 43.

The control unit 43 can process these and further input parameters, for example, from a pressure sensor in the internal pressure tank 32, and use for controlling and/or regulating the plunger speed or the profile of the plunger speed ("flank control"). Depending on the measured values, the control unit 43, for example, controls the pressure regulator 35 so that a certain target pressure of the pressure medium (supply pressure) is present in the internal pressure tank 32 in order to achieve a constant plunger speed.

Alternatively or additionally, the control unit 43 can control a throttle device 28 for regulating the flow of the pressure medium, for example, using a piezoelectric actuator 28, here in the region of the control valve 20, as a function of input parameters to achieve a certain plunger speed or a desired speed profile during the discharge movement and/or retraction movement of the plunger 80.

The control unit 43 can further control a heating device 47 of the dosing system 1 to heat the dosing material in the nozzle 70 to a desired temperature. The control unit 43 can preferably control and/or regulate the heating device 47 as a function of a temperature measured value, wherein the temperature measured value is determined by means of a temperature sensor 48.

The control unit 43 can also access a second pressure regulator 35' which controls the pressure of the pressure medium in the dosing material cartridge 64 (cartridge pressure).

FIG. 8 schematically shows a representation of a speed profile of a possible plunger movement according to an embodiment of the invention. The control of the speed profile is also referred to as flank control. A relative position PS of the plunger tip in relation to a relative time t of the discharge process is illustrated. The position PD of the sealing seat of the nozzle in the dosing system is shown here by dashed lines.

The plunger is in a rest position before the start of the discharge process, at time $T_1$. This means that the tip of the plunger has the greatest possible distance from the nozzle, so that the nozzle of the dosing system is unlocked.

At a time $T_2$, the actuator is filled with high pressure by pressure medium, which leads to a high discharge speed of the plunger. For example, a piezoelectric actuator could be fully opened for this purpose to allow the greatest possible air flow.

At a time $T_3$, for example, the discharge speed of the plunger is slowed down shortly before the impact of the plunger tip in the sealing seat of the nozzle. For example, in which the air flow through the pneumatic actuator is reduced. Thus, the impact of the plunger tip take place in the sealing seat of the nozzle at time $T_4$ at a lower speed, which can improve the dosing accuracy of certain dosing materials.

Only for the sake of completeness, it should be noted that such control of the flanks is of course possible even with a retraction movement of the plunger.

It is finally pointed out once again that the dosing systems described in detail above are merely embodiments which can be modified by the person skilled in the art in various ways without departing from the scope of the invention. For example, the dosing system can comprise further sensors for determining relevant operating parameters, for example, a sensor for determining a temperature of the control valve. Furthermore, the use of the indefinite article "a" or "an" does not exclude that the characteristics in question can also be present multiple times.

LIST OF REFERENCE NUMBERS 1 dosing system
10 actuator unit
11 housing
11a, 11b housing block/components of the housing
12 actuator
13 membrane
14 actuator base body
14a, 14b components of the actuator base body
15 actuator sealing ring
16 actuator chamber
17 bore of the actuator chamber
18 sensor
19 membrane underside
20 control valve
21 connection cable of the control valve
22 compressed air connection
23 working connection
24 vent connection
25 discharge opening/bore of the pressure tank
26 bore of the venting region
27, 27' flow channel
28 throttle device
30 pressure medium supply device
31 coupling point 32 pressure reservoir
33 pressure sensor
34 venting region/cooling device
35, 35' pressure regulator
36 external pressure reservoir
37 pressure medium feed
40 connection
41 coupling point for connection cable
42 circuit board
43 control unit
44 connection cable of the control unit
45 fixing element
46, 46' cavity
47 heating device
48 temperature sensor
50 coupling mechanics
51 coupling spring
52 ball
53 plug-in coupling part
54 spherical calotte
60 fluidic unit
61 fluid body
62 supply channel
63 coupling point of the media cartridge
64 media cartridge
65 clamping screw
70 nozzle
71 nozzle chamber
72 outlet opening
73 sealing seat
80 discharge element/plunger
81 plunger head
82 plunger tip
83 plunger bearing
84 plunger spring
85 plunger seal
86 contact surface
DE pressure medium expands
DK pressure medium compresses
DA pressure medium outlet
PD position of the sealing seat
PS position of the plunger tip
RA discharge direction of the plunger
RD, RD', RD", RD''' flow direction pressure medium
RM discharge direction of the dosing material
t time of the discharge movement
$T_1$, $T_2$, $T_3$, $T_4$ time

The invention claimed is:

1. A dosing system (1) for dosing a dosing material, which dosing system (1) has a housing (11) comprising a nozzle

(70) and a supply channel (62) for dosing material, a discharge element (80) movably mounted in the housing (11), a plunger bearing (83) surrounding the discharge element (80) for guiding the discharge element (80) in an axial direction, and an actuator unit (10) coupled to the discharge element, the actuator unit (10) comprising an actuator (12) having a membrane (13) which is pressurized by a pressure medium to move the discharge element (80) in a discharge direction (RA), wherein a gaseous and/or liquid substance is used as the pressure medium, and the pressure medium hits directly on a side surface of the membrane (13) facing away from the discharge element (80), and the discharge element (80) being formed separately and being pressed against a side surface (19) of the membrane (13) pointing in the direction of the discharge element (80) by a force acting on the discharge element (80) for coupling to the actuator unit (10), wherein the plunger bearing (83) is disposed between the membrane (13) and the nozzle (70), the plunger bearing separating the supply channel (62) from the actuator unit (10); and wherein the discharge element (80) comprises a plunger head (81) extending radially from one end of the discharge element (80), the plunger head (81) being urged toward the side surface (19) of the membrane (13) by a return spring (84) with one end resting on the plunger bearing (83) and the return spring (84) having an opposite end pressing on an underside of the plunger head (81) to couple the discharge element (80) with the membrane (13), such that the return spring (84) provides a force on the discharge element (80) in the axial direction.

2. The dosing system according to claim 1, wherein the dosing system (1) is formed so that the force acting on the discharge element (80) for coupling is directed in the opposite direction to a discharge direction (RA) of the discharge element (80).

3. The dosing system according to claim 1, wherein the membrane (13) is formed like a disk and/or free of cavities.

4. The dosing system according to claim 1, wherein the dosing system (1) comprises at least one sensor (18) for measuring a speed of a movement of the discharge element (80).

5. The dosing system according to claim 1, wherein the dosing system (1) comprises at least one pressure regulator (35) to control and/or regulate a pressure of the pressure medium as a function of an input parameter by a control and/or regulating unit (43) of the dosing system (1).

6. The dosing system for dosing a dosing material according to claim 1, further comprising a control valve (20) for controlling the actuator (12), the control valve having at least one throttle device (28) which is formed to control and/or regulate a pressure in the actuator (12) as a function of an input parameter, preferably by a control and/or regulating unit (43) of the dosing system (1).

7. The dosing system for dosing a dosing agent according to claim 1, wherein the dosing system (1) further comprises a control valve (20) for controlling the actuator (12), the control valve having at least one throttle device (28) which is formed to control and/or regulate a pressure profile during a filling of the actuator (12) and/or during emptying of the actuator (12).

8. The dosing system according to claim 1, wherein the dosing system (1) is formed such that a pressure is maintained in a region between the membrane (13) and a plunger seal (85), which pressure essentially corresponds to a cartridge pressure and/or wherein the dosing system (1) is formed such that a negative pressure is maintained in a region between an underside of the membrane (13) and the plunger seal (85).

9. A method for controlling a dosing system (1) for dosing a dosing material, which dosing system (1) has a housing (11) comprising a nozzle (70) and a supply channel (62) for dosing material, a discharge element (80) movably mounted in the housing (11), a plunger bearing (83) surrounding the discharge element (80) for guiding the discharge element (80) in an axial direction, and an actuator unit (10) coupled to the discharge element, a membrane (13) of an actuator (12) of the actuator unit (10) being pressurized by a pressure medium to move the discharge element (80) in a discharge direction (RA), wherein a gaseous and/or liquid substance is used as the pressure medium, and the pressure medium hits directly on a side surface of the membrane (13) facing away from the discharge element (80), and the discharge element (80) being pressed against a side surface (19) of the membrane (13) pointing in the direction of the discharge element (80) by a force acting on the discharge element (80) for coupling to the actuator unit (10);

wherein the plunger bearing (83) is disposed between the membrane (13) and the nozzle (70), the plunger bearing separating the supply channel (62) from the actuator unit (10); and wherein the discharge element (80) comprises a plunger head (81) extending radially from one end of the discharge element (80), the plunger head (81) being urged toward the side surface (19) of the membrane (13) by a return spring (84) with one end resting on the plunger bearing (83) and the return spring (84) having an opposite end pressing on an underside of the plunger head (81) to couple the discharge element (80) with the membrane (13), such that the return spring (84) provides a force on the discharge element (80) in the axial direction.

10. The method according to claim 9, wherein a pressure of the pressure medium is controlled and/or regulated as a function of an input parameter so that a speed of the discharge element (80) corresponds to a target value during a discharge movement.

11. The method according to claim 9, wherein a pressure of a pressure medium flowing into the actuator (12) and/or a pressure of a pressure medium flowing out of the actuator (12) is controlled and/or regulated as a function of an input parameter so that a speed of the discharge element (80) corresponds to a target value during a discharge movement and/or a retraction movement.

12. The method for controlling a dosing system (1) for dosing a dosing material according to claim 9, wherein a pressure of the pressure medium is controlled and/or regulated, preferably a throttle device (28) of the dosing system (1) is controlled by a control and/or regulating unit (43) of the dosing system (1) so that a speed of the discharge element (80) is varied during a discharge movement and/or during a retraction movement.

13. The dosing system according to claim 1, wherein the plunger bearing (83) is adjacent to the membrane (13).

* * * * *